(12) United States Patent
Kurakagi

(10) Patent No.: US 8,941,714 B2
(45) Date of Patent: Jan. 27, 2015

(54) TRANSMITTING DEVICE, RECEIVING DEVICE, DATA TRANSMISSION METHOD

(71) Applicant: Fujitsu Limited, Kawasaki-shi, Kanagawa (JP)

(72) Inventor: Keiji Kurakagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 13/948,913

(22) Filed: Jul. 23, 2013

(65) Prior Publication Data

US 2014/0028782 A1 Jan. 30, 2014

(30) Foreign Application Priority Data

Jul. 27, 2012 (JP) ................................. 2012-166996

(51) Int. Cl.
*H04N 7/14* (2006.01)
*H04N 5/232* (2006.01)

(52) U.S. Cl.
CPC ........... *H04N 7/147* (2013.01); *H04N 5/23219* (2013.01); *H04N 5/23293* (2013.01)
USPC .................. 348/14.12; 348/E7.077; 382/173; 382/195

(58) Field of Classification Search
USPC .................. 348/14.12, E7.077; 382/173, 195
See application file for complete search history.

(56) References Cited

U.S. PATENT DOCUMENTS

2008/0242352 A1   10/2008  Koshijima et al.
2010/0085420 A1*  4/2010   Kato et al. ................. 348/14.12

FOREIGN PATENT DOCUMENTS

| JP | 04-151988 A | 5/1992 |
| JP | 09-307893 A | 11/1997 |
| JP | 2001-352547 A | 12/2001 |
| JP | 2004-173320 A | 6/2004 |
| JP | 2005-018451 A | 1/2005 |
| JP | 2008-245208 A | 10/2008 |

* cited by examiner

*Primary Examiner* — Creighton Smith
(74) *Attorney, Agent, or Firm* — Maschoff Brennan

(57) ABSTRACT

A transmitting device includes a partial-image-generator that identifies a certain region from image data, the partial-image-generator generating a certain partial image including the certain region identified from the image data, associating region information indicating the certain region with the certain partial image, and causing the region information and the certain partial image to be stored in a data-storage-unit, an image-processing-unit that executes, on the certain partial image associated with the region information and stored in the data-storage-unit, predetermined image processing associated with the region information, a difference-determining-unit that determines whether or not there is a difference between the certain partial image after the image processing and another partial image generated before a generation of the certain partial image and subjected to the image processing, and a transmitter that transmits the certain partial image subjected to the image processing by the image-processing-unit if the difference-determining-unit determines that there is the difference.

7 Claims, 20 Drawing Sheets

TRANSMITTING DEVICE, RECEIVING DEVICE, DATA TRANSMISSION METHOD

CROSS-REFERENCE TO RELATED APPLICATION

This application is based upon and claims the benefit of priority of the prior Japanese Patent Application No. 2012-166996, filed on Jul. 27, 2012, the entire contents of which are incorporated herein by reference.

FIELD

The embodiments discussed herein are related to a technique for transmitting and receiving video data.

BACKGROUND

A technique for coding a video image and transmitting and receiving the video image to and from a destination communication device is provided for a videophone system, a teleconference system, and the like. For example, a certain communication device transmits and receives video data and audio data to and from one or more communication devices.

In addition, there is a technique for matching an image of an object with layered three-dimensional structural models, analyzing a motion for each of the structural models, and outputting an analytical parameter of a structural model from which a motion has been detected.

Japanese Laid-open Patent Publication No. 04-151988 is an example of related art.

In the conventional videophone system or the like, however, a video image of a user who is an object and a place at which the user exists is transmitted to a destination device without a change. Thus, if communication is private and the user is not dressed properly, the user may hesitate to use a videophone function.

On the other hand, if the video image is processed and transmitted, there is a problem that a process load of a transmitter increases. In addition, if the video image and other data are transmitted, there is a problem that the amount of data traffic increases.

An object of a technique disclosed herein is to provide a technique for processing an image to be displayed by a destination communication device while suppressing an increase in a process load and an increase in the amount of data traffic.

SUMMARY

According to an aspect of the application, an apparatus includes a transmitting device includes a partial image generator that identifies a certain region from image data, the partial image generator generating a certain partial image including the certain region identified from the image data, associating region information indicating the certain region with the certain partial image, and causing the region information and the certain partial image to be stored in a data storage unit, an image processing unit that executes, on the certain partial image associated with the region information and stored in the data storage unit, predetermined image processing associated with the region information, a difference determining unit that determines whether or not there is a difference between the certain partial image after the image processing and another partial image generated before a generation of the certain partial image and subjected to the image processing, and a transmitter that transmits the certain partial image subjected to the image processing by the image processing unit if the difference determining unit determines that there is a difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a communication device 1 according to an embodiment is described. The configuration of the communication device according to the embodiment is an example. The communication device 1 according to the embodiment is not limited to the configuration described in the embodiment. Process flows according to the embodiment are examples. The communication device 1 may change the orders of processes and execute two or more processes in parallel as long as results of the processes are unchanged.

Figure 1:
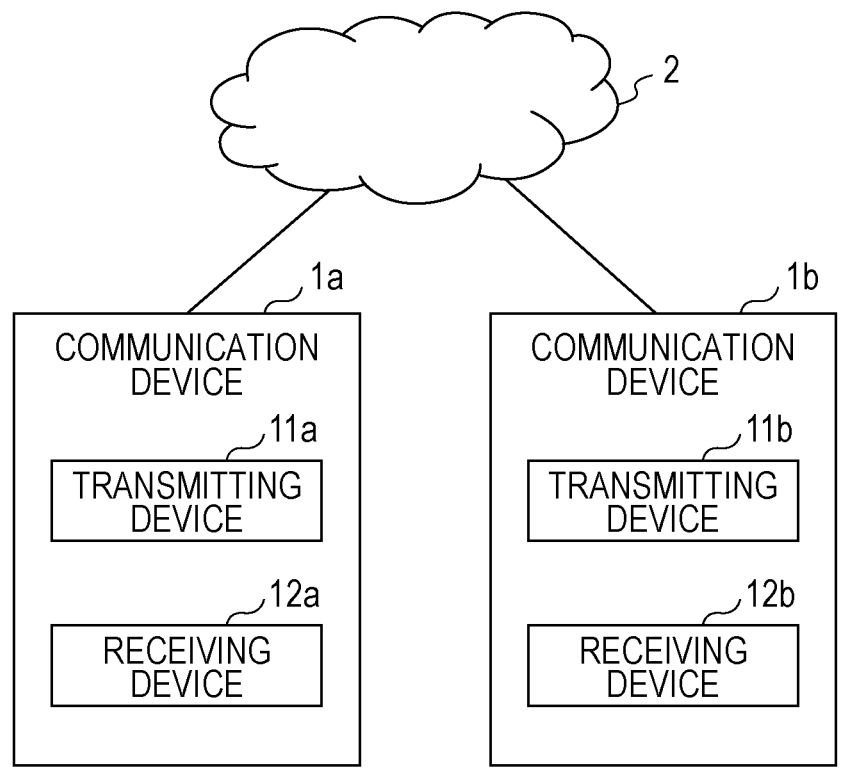
FIG. 1 is a diagram illustrating an example of the configuration of a system according to an embodiment.

FIG. 1 illustrates an example of the configuration of a system according to the embodiment. The system according to the embodiment includes a plurality of the communication devices 1 (1a and 1b in FIG. 1). The communication devices 1 are connected to each other through a network 2. The communication devices 1 include transmitting devices 11 (11a and 11b in FIG. 1) and receiving devices 12 (12a and 12b in FIG. 1). The communication devices 1 transmit and receive video data including image data and audio data to and from each other through the network 2. The communication devices 1 according to the embodiment may sequentially display a plurality of image data items and thereby form a video image. The audio data includes various sounds such as human voice and music. Each of three or more communication devices 1 may communicate with all the other communication devices 1 in the system, although the three or more communication devices 1 are not illustrated. Note that an existing protocol such as TCP/IP may be used for the transmission and reception of the video data. The video data generated in the embodiment is transmitted and received as a protocol data unit (PDU) such as a packet.

Figure 2:
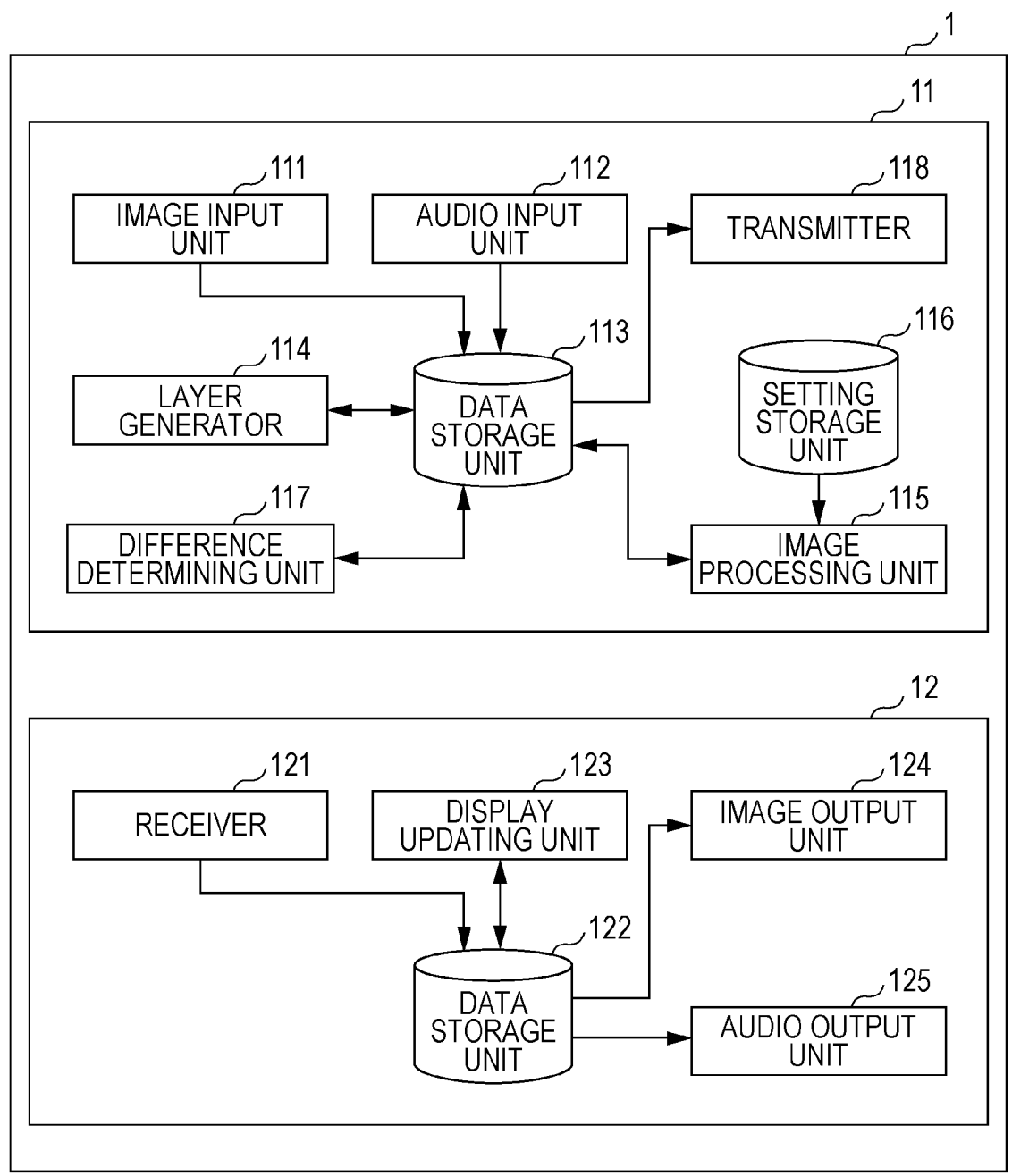
FIG. 2 illustrates an example of a functional block diagram of a communication device.

FIG. 2 illustrates an example of a functional block diagram of the communication device 1. The communication device 1 includes the transmitting device 11 and the receiving device 12.

The transmitting device 11 includes an image input unit 111, an audio input unit 112, a data storage unit 113, a layer generator 114, an image processing unit 115, a setting storage unit 116, a difference determining unit 117, and a transmitter 118. The image input unit 111 acquires image data captured using an imaging device such as a camera and causes the image data to be stored in the data storage unit 113. The audio input unit 112 acquires audio data input using a microphone or the like, associates the audio data with the image data or the like, and causes the audio data to be stored in the data storage unit 113, for example. The layer generator 114 reads the image data from the data storage unit 113, generates a plurality of layer data items from the image data on the basis of an object, and causes the plurality of layer data items to be stored in the data storage unit 113. The layer data items include partial image data and are sheets forming virtual layers. A single image is formed by overlapping the plurality of layer data items using predetermined coordinates on a plane as standards. The image processing unit 115 reads information from the setting storage unit 116 storing the information indicating image processing to be applied to the layer data items, executes the image processing on the layer data items stored in the data storage unit 113, and causes the layer data items after the image processing to be stored in the data storage unit 113. The difference determining unit 117 determines whether or not there is a difference between a newly generated layer data item among the layer data items stored in the data storage unit 113 and subjected to the image processing and a previously generated layer data item among the layer data items stored in the data storage unit 113 and subjected to the image processing. The transmitter 118 reads, from the data storage unit 113, a layer data item determined to have a difference between the layer data item and another layer data item. In addition, the transmitter 118 reads, from the data storage unit 113, audio data acquired by the audio input unit 112 and associated with image data processed as layer data items, for example. The transmitter 118 transmits the read layer data item and the read audio data to the other communication device 1 that is a destination communication device.

The receiving device 12 includes a receiver 121, a data storage unit 122, a display updating unit 123, an image output unit 124, and an audio output unit 125. The receiver 121 receives a layer data item and audio data from the other communication device 1 that is the destination communication device. Then, the receiver 121 causes the layer data item and the audio data to be stored in the data storage unit 122. The display updating unit 123 replaces a layer data item stored in the data storage unit 122 with the received layer data item and updates the layer data item to be displayed. The image output unit 124 reads a plurality of layer data items to be displayed from the data storage unit 122, superimposes the read layer data items, and causes the layer data items to be displayed on an output device such as a display. The audio output unit 125 reads audio data from the data storage unit 122 and causes the audio data to be output by an output device such as a speaker.

The communication device 1 according to the embodiment is achieved by causing an information processing device to execute a program according to the embodiment, while the information processing device is a personal computer with a camera and a microphone, a videoconference system, a mobile phone, a smart phone, a tablet terminal, a land-line phone with a camera, a sticker printing device (photo sticker device) with a communication function and an audio input function, or the like.

Figure 3:
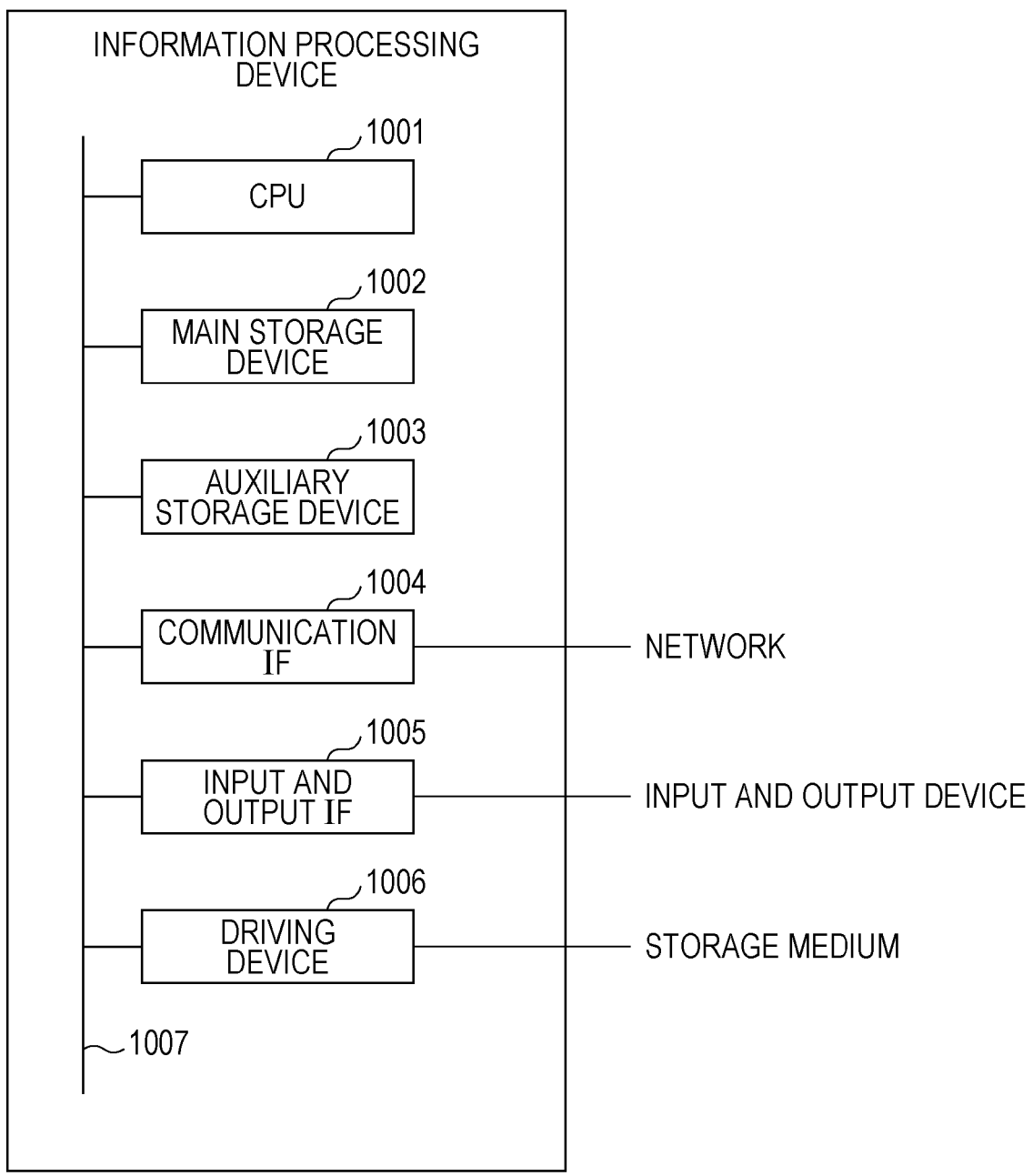
FIG. 3 is a diagram illustrating an example of the configuration of the communication device.

FIG. 3 illustrates an example of the configuration of the communication device 1. The communication device 1 is the aforementioned information processing device and includes a central processing unit (CPU) 1001, a main storage device 1002, an auxiliary storage device 1003, a communication interface (IF) 1004, an input and output interface (IF) 1005, a driving device 1006, and a communication bus 1007. The CPU 1001 executes the program and thereby executes processes described later in the embodiment. The main storage device 1002 caches the program read by the CPU 1001 and data and expands a work region of the CPU 1001. The main storage device 1002 is a random access memory (RAM), a read only memory (ROM), or the like. The auxiliary storage device 1003 stores the program executed by the CPU 1001 and setting information used in the embodiment. The auxiliary storage device 1003 is a hard disk drive (HDD), a solid state drive (SSD), a flash memory, or the like. The communication IF 1004 transmits and receives data to and from another computer device. The communication IF 1004 is a wired or wireless network card or the like. The input and output IF 1005 is connected to an input and output device, receives an entry from a user, and outputs information to the user. The input and output device is an image input device such as a camera, an audio input device such as a microphone, a keyboard, a mouse, a display, a printer, a touch panel, or the like. The driving device 1006 reads data stored in a storage medium such as a flexible disk, a compact disc (CD), a digital versatile disc (DVD), a Blu-ray disc (BD), or the like and writes data in the storage medium. The constituent elements 1001 to 1006 are connected to each other through the communication bus 1007. The numbers of the constituent elements 1001 to 1006 may be two or more. A part (for example, the driving device 1006) of the constituent elements 1001 to 1006 may not be arranged. The program that is executed in the embodiment may be provided through a driving device readable portable storage medium or an auxiliary storage device such as a USB memory. The CPU 1001 executes the program and thereby operates the aforementioned information processing device as the communication device 1.

Transmission Process

Next, a process of transmitting video data is described. The transmission process is executed by the transmitting device 11 of the communication device 1.

Figure 4:
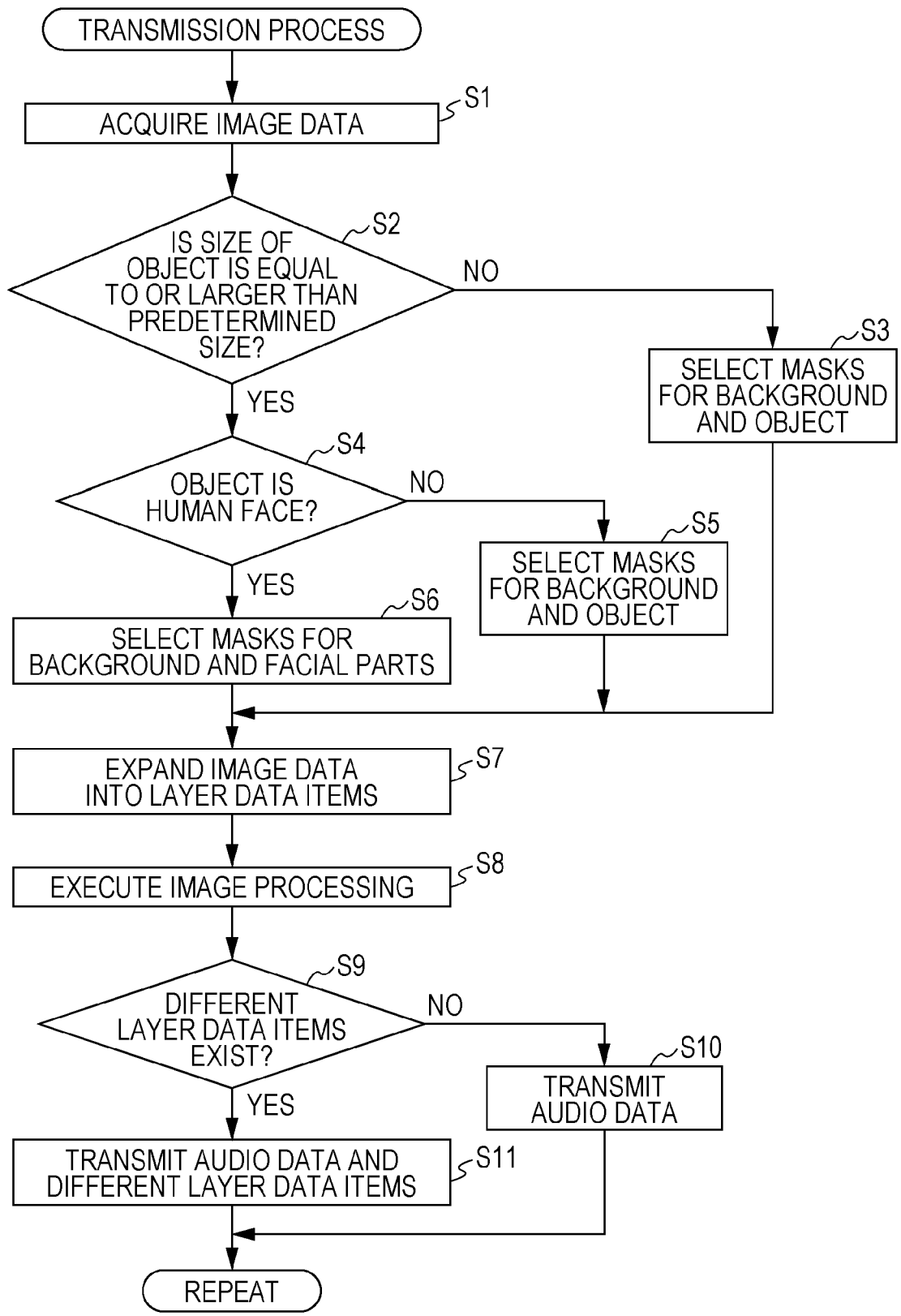
FIG. 4 is a flowchart of an example of a transmission process according to the embodiment.

FIG. 4 is a flowchart of an example of the transmission process according to the embodiment. First, the image input unit 111 of the transmitting device 11 acquires image data through a camera or the like and causes the image data to be stored in the data storage unit 113, and the audio input unit 112 acquires audio data through a microphone or the like and causes the audio data to be stored in the data storage unit 113 (in S1 illustrated in FIG. 4). The image data and the audio data are generated by coding an image and a sound.

Next, the layer generator 114 reads the image data from the data storage unit 113 and determines whether or not the size of an object is equal to or larger than a predetermined size (in S2). For example, the layer generator 114 identifies the contour of the object depicted in a central part of the image data on the basis of the contrast of pixels. Then, the layer generator 114 determines whether or not the area of a region that depicts the object is equal to or larger than the predetermined size, for example, one fourth of the area of the overall image data.

Figure 5:
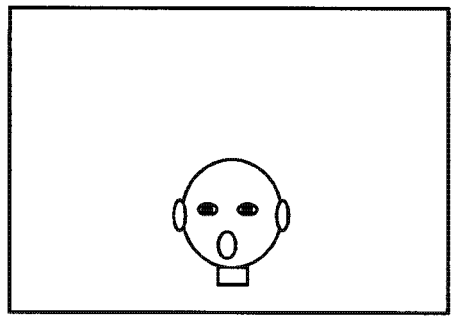
FIG. 5 is a diagram illustrating an example of image data.

It is assumed that image data illustrated in FIG. 5 is read in S1. FIG. 5 is a diagram illustrating an example of the image data. A person is depicted as an example of the object in a region located near the center of the image data illustrated in FIG. 5. In FIG. 5, the area of a region that depicts the object is smaller than one fourth of the area of the overall image data. The layer generator 114 scans the image data from the center of the image, searches and traces a boundary at which differences between contrast values are equal to or larger than a threshold, and identifies the region depicting the object. For this process, an existing technique may be used. Then, the layer generator 114 identifies the region depicting the object such as the person illustrated in FIG. 5, calculates the area of the identified region, and determines that the area of the region is smaller than one fourth of the area of the overall image data.

If the layer generator 114 determines that the area of the region depicting the object is smaller than the predetermined size (No in S2), the layer generator 114 selects a mask data item for a background and a mask data item for the object (in S3). For example, a plurality of mask data items that indicate positions and sizes are prepared in advance. The mask data item that includes the region depicting the object, and the mask data item that includes another region, are selected. As the mask data items, data that corresponds to the pixels of the image data and has true or false values may be used. Specifically, the mask data items are used to cut off regions overlapping between the image data and the mask data items from the image data by executing an AND operation of the image data and the mask data items. The layer generator 114 may generate a mask data item including the object and a mask data item including another region on the basis of coordinates indicating the contour of the object without using the prepared mask data items.

In S3, the layer generator 114 selects a mask data item that has true values indicating the region depicting the object identified in S2 and false values indicating the other region, and a mask data item that has false values indicating the region depicting the object and true values indicating the other region, for example. The layer generator 114 may use the mask data items to cut off the region depicting the object and the region depicting the background from the image data. After that, the process proceeds to S7.

Figure 6:
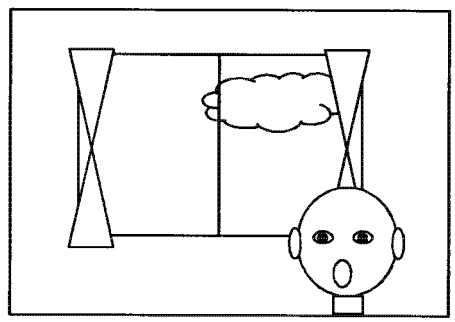
FIG. 6 is a diagram illustrating an example of the image data.

It is assumed that image data illustrated in FIG. 6 is read in S2. FIG. 6 is a diagram illustrating an example of the image data. A window is depicted in a region located near the center of the image data. The area of the window depicted in the image data is equal to or larger than one fourth of the area of the overall image data. In this case, the layer generator 114 identifies the region depicting the window in the image data and determines that the area of the identified region is equal to or larger than one fourth of the area of the overall image data.

If the layer generator 114 determines that the object is equal to or larger than the predetermined size (Yes in S2), the layer generator 114 determines whether or not the object is a human face (in S4). An existing technique such as template matching may be used for the determination made in S4. Specifically, the main storage device 1002 that is included in the transmitting device 11 stores a facial pattern image (or a template) including standard points indicating eyes, a mouth, and ears (for example, ear lobes). The template is data indicating relative positional relationships among the eyes, nose, ears, and the like of a person. The template is generated by calculating average data from data of the faces of multiple persons, for example. The template may be represented using contrast information represented by a predetermined number of gray levels, binary information, color information, or the like. The color information is effective if a difference between gray levels is hardly determined.

The layer generator 114 scans the image data and determines whether or not a region that is similar to the template is included in the image data. For example, the layer generator 114 compares contrast information of a pixel included in a region of the image data with contrast information of a pixel included in the template and uses an existing evaluation method to determine whether or not the contrast information of the pixels matches. A plurality of templates corresponding to a human face imaged at various angles (or turned in various directions) may be stored in the data storage unit 113 or the like, and the layer generator 114 may detect the human face turned in the various directions. For the image data illustrated in FIG. 6, a region that is similar to the template of the human face is not detected from an image of the window that is the object and depicted in a central region of the image data, and the layer generator 114 determines that the object is not the human face.

If the layer generator 114 determines that the object is not the human face (No in S4), the layer generator 114 selects the mask data item for the background and the mask data for the object (in S5). In S5, the layer generator 114 selects the mask data items described in S3. In addition, the layer generator 114 may generate mask data items on the basis of the contour of the object in the same manner as S3. In S5, the layer generator 114 may generate finer mask data items than the mask data items generated in S3, while in S3, the layer generator 114 may generate more coarse mask data items than the mask data items generated in S5. After that, the process proceeds to S7.

Figure 7:
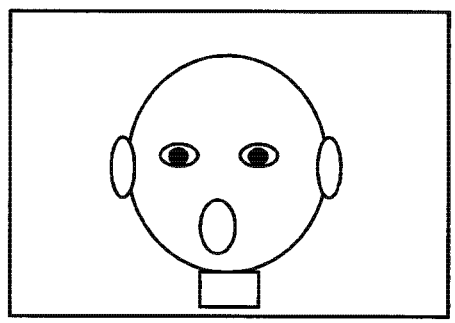
FIG. 7 is a diagram illustrating an example of the image data.
Figure 8:
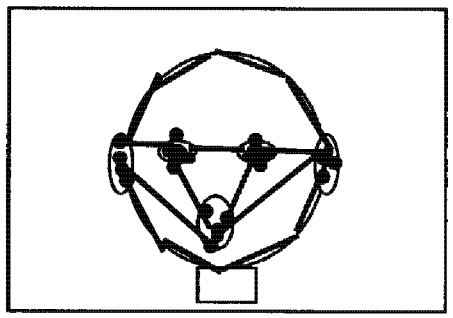
FIG. 8 is a diagram describing template matching.

It is assumed that image data illustrated in FIG. 7 is read in S4. FIG. 7 is a diagram illustrating an example of the image data. A person is depicted in a central region of the image data illustrated in FIG. 7. The size of the person in the image data is equal to or larger than one fourth of the overall image data. In this case, the standard points that indicate the eyes, mouth, ears and the like and match the template of the face are detected from the image data in S4 as illustrated in FIG. 8, and the layer generator 114 determines that the object is the human face. Note that the layer generator 114 may hold the coordinates of the detected points (for example, the standard points) and use the coordinates of the detected points for a subsequent process.

If the layer generator 114 determines that the object is the human face (Yes in S4), the layer generator 114 selects, for each of facial parts, a mask data item associated with the template and stored (in S6). The mask data items that correspond to the template for the object detected as the human face in S4 are read from the data storage unit 113. In this case, the layer generator 114 selects the plurality of mask data items that include regions depicting eyes, a mouth, ears, a face, a neck and a background. Mask data items of parts that are a nose, hair, a body and the like as well as the exemplified parts may be used. A mask data item of a part of the exemplified parts may not be used. For example, mask data items that correspond to parts illustrated in FIGS. 9A to 9F may be selected.

Figure 9A:
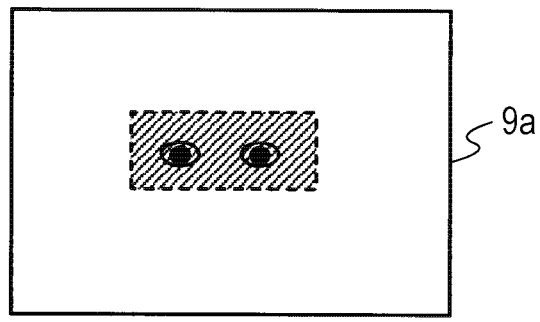
FIG. 9A is a diagram illustrating an example of a mask data item corresponding to a facial part.

FIGS. 9A to 9F are diagrams illustrating examples of the plurality of mask data items corresponding to the facial parts. In FIGS. 9A to 9F, regions hatched by diagonal lines indicate regions for which values corresponding to pixels are set to true values. In FIGS. 9A to 9F, parts of the object overlap each other for convenience of a description. FIG. 9A illustrates a mask data item corresponding to a region depicting the eyes. In the embodiment, as illustrated in FIG. 9A, mask data items that include regions located around the facial parts as well as the facial parts are prepared.

Figure 9B:
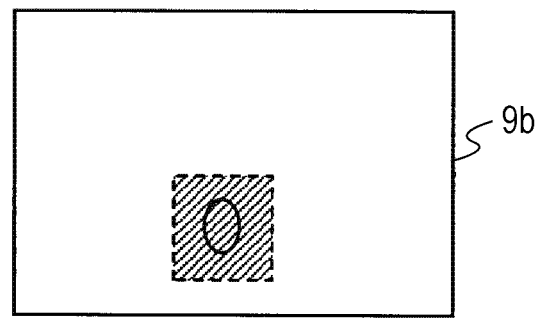
FIG. 9B is a diagram illustrating an example of a mask data item corresponding to a facial part.
Figure 9C:
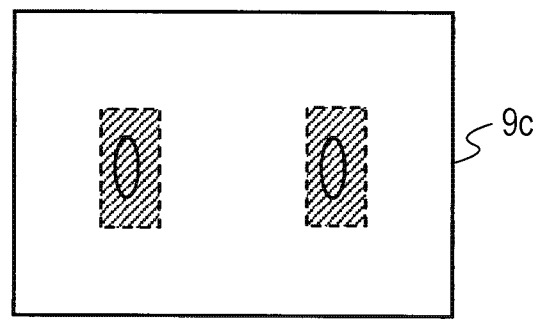
FIG. 9C is a diagram illustrating an example of a mask data item corresponding to a facial part.
Figure 9D:
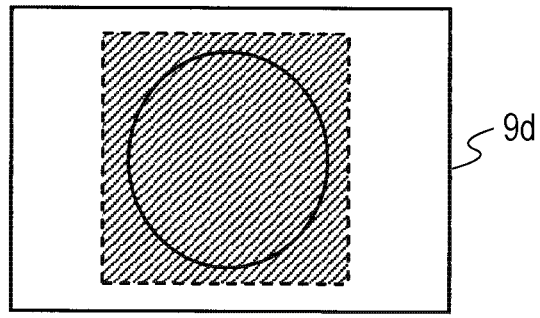
FIG. 9D is a diagram illustrating an example of a mask data item corresponding to a facial part.
Figure 9E:
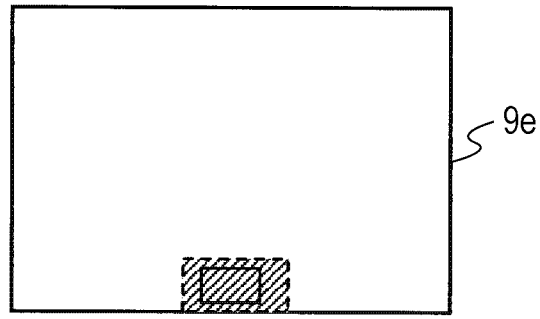
FIG. 9E is a diagram illustrating an example of a mask data item corresponding to a facial part.
Figure 9F:
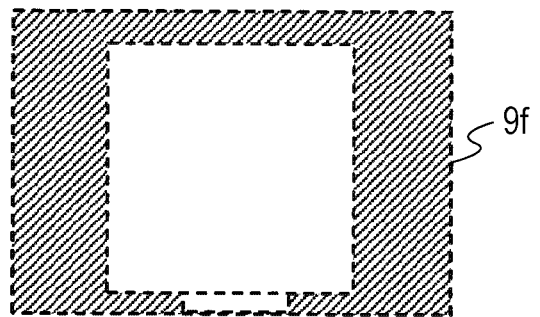
FIG. 9F is a diagram illustrating an example of a mask data item corresponding to a facial part.
Figure 10A:
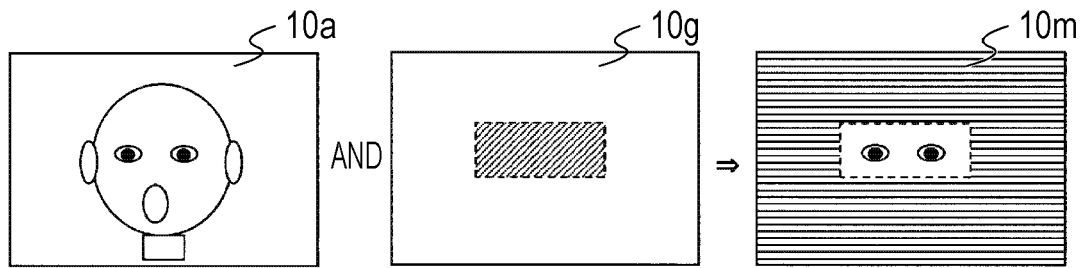
FIG. 10A is a diagram describing an example of generation of a layer data item.
Figure 10B:
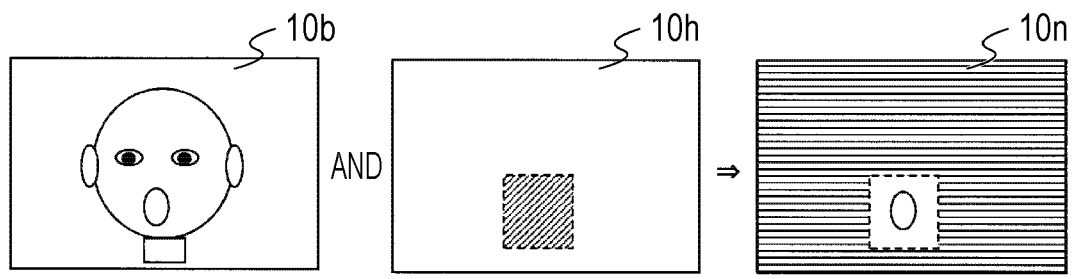
FIG. 10B is a diagram describing an example of generation of a layer data item.
Figure 10C:
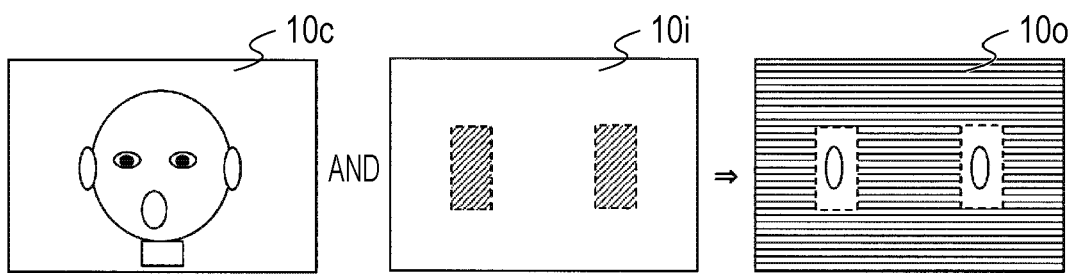
FIG. 10C is a diagram describing an example of generation of a layer data item.
Figure 10D:
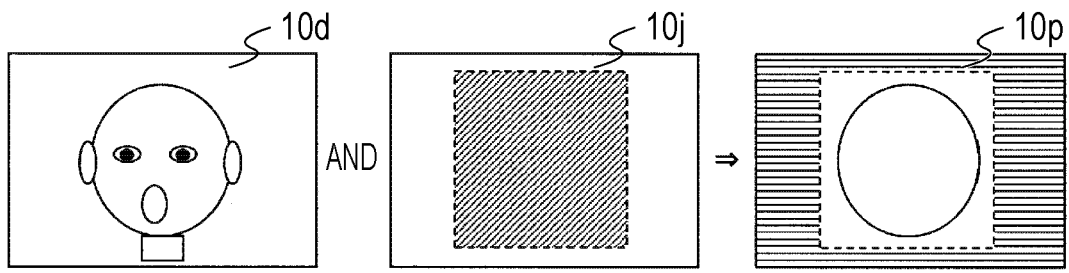
FIG. 10D is a diagram describing an example of generation of a layer data item.
Figure 10E:
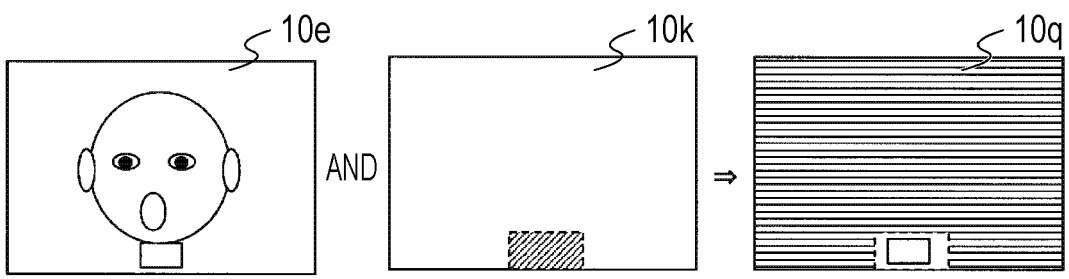
FIG. 10E is a diagram describing an example of generation of a layer data item.
Figure 10F:
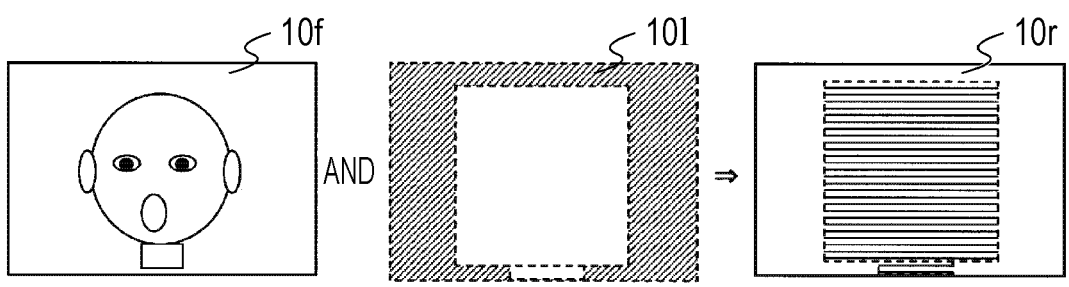
FIG. 10F is a diagram describing an example of generation of a layer data item.

In a similar manner to FIG. 9A, FIG. 9B illustrates a mask data item corresponding to the mouth, FIG. 9C illustrates a mask data item corresponding to the ears, FIG. 9D illustrates a mask data item corresponding to the face, FIG. 9E illustrates a mask data item corresponding to the neck, and FIG. 9F illustrates a mask data item corresponding to the background. The mask data item of the background may include the overall image. The mask data item of the face may exclude regions corresponding to the eyes, the mouth and the like from the region illustrated in FIG. 9D. When a mask data item is selected for each of the facial parts, the process proceeds to S7.

The positions of the regions that are included in the mask data items and for which the true values are set may be adjusted so as to match the template of the face. The mask data items prepared for the template of the face may not be selected. The contours of the eyes, mouth, ears, face and neck may be extracted from the image data, and mask data items that correspond to regions depicting the parts and another region may be generated. The shapes of the mask data items may be shapes other than a rectangle or may be shapes obtained by enlarging the contours of the facial parts.

After S3, S5, and S6, the layer generator 114 generates layer data items on the basis of the image data stored in the data storage unit 113 and the mask data items and causes the layer data items to be stored in the data storage unit 113 (in S7). Specifically, the layer generator 114 extracts partial images that are regions included in the image data and overlapping the mask data items. Then, the layer generator 114 generates the layer data items indicating, as transparent regions, parts that are included in the image data and do not overlap the mask data items. A process of generating a layer data item for each of the facial parts is described below with reference to FIGS. 10A to 10F.

FIGS. 10A to 10F are diagrams describing an example of the generation of the layer data items. First, the layer generator 114 copies the image data for the number of the mask data items generated in S3, S5, or S6. For example, as indicated by 10*a* to 10*f* illustrated in FIGS. 10A to 10F, the image data is copied. Then, the layer generator 114 uses one of the copied image data items and one of the mask data items for each of the facial parts, cuts off a region (or a region depicting the facial part) overlapping the mask data item and the image data item, and generates a layer data item corresponding to the facial part. Specifically, the layer generator 114 executes an AND operation of the image data item and the mask data item, extracts a partial image of the region (or the region overlapping the mask data item) that is included in the image data item and from which the AND operation produces a true value. Then, the layer generator 114 treats the extracted partial image as the layer data item. If an R, G, or B value of each of pixels of the image data item is equal to or larger than a predetermined standard value, the AND operation of the image data item and the mask data item may produce a true value. If the image data item is a monochromatic image, and a gray level of each of the pixels of the image data item is equal to or larger than a standard value, the AND operation of the image data item and the mask data item produces a true value.

Reference symbols 10*g* to 10*l* illustrated in FIGS. 10A to 10F indicate the mask data items generated in S6. Regions that correspond to regions hatched by diagonal lines and included in the mast data items 10*g* to 10*l* are cut off from the image data items 10*a* to 10*f*, and whereby layer data items indicated by 10*m* to 10*r* in FIGS. 10A to 10F are generated. Regions that are hatched by horizontal lines in the layer data items 10*m* to 10*r* and in which image data does not exist are transparent regions. Specifically, when the layer data items 10*m* to 10*r* overlap each other in a depth direction of the display and coordinates located on the upper left sides of the layer data items 10*m* to 10*r* are treated as the origin, the hatched regions are transparent and the image data included in the layer data items located on the back side is displayed.

When mask data items corresponding to the object and the background are generated in S3 or S5, layer data items for which the object is extracted from the image data, and a layer data item for which the background is extracted from the image data, are generated in S7.

In S7, the layer generator 114 adds identification codes to the layer data items and causes the layer data items having the identification codes added thereto to be stored in the data storage unit 113. The identification codes are codes to be used to identify the layer data items. For example, the identification codes each include region information indicating an image region (depicting a facial part, for example) and time-series information indicating a chronological order that a corresponding image data item is generated or a chronological order in which the corresponding layer data item is generated. For example, if region information that indicates a "background", a "neck", a "face", "ears", a "mouth", and "eyes" is "1", "2", "3", "4", "5", and "6", identification codes of "1-1", "2-1", "3-1", "4-1", "5-1", and "6-1" are added to the layer data items first generated after the start of the process (or having chronological information of "1"). When layer data items are generated for the next frame (or image data) of video data, identification codes that include chronological information incremented by 1 are added to the layer data items of the region information.

The layer generator 114 may cause the identification codes to be stored in, for example, files (or the layer data items) as header information, or may use a naming rule that enables the identification codes to be read on the basis of the names of the files. The layer generator 114 may specify the order in which the layer data items are overlapped from the back side to the front side. Specifically, the system may superimpose the layer data items in the depth direction and display the layer data items on the basis of the region information. The system may use the exemplified consecutive numbers as the chronological information as described above. The system may use, as the chronological information, time stamps that indicate times when the files are generated. The system may not use the chronological information as long as a newly generated layer data item is distinguished from a previously generated layer data item.

After that, the image processing unit 115 uses setting data stored in the setting storage unit 116 and the layer data items stored in the data storage unit 113, executes the image processing so as to process the image data included in the layer data items, and causes the layer data items after the image processing to be stored in the data storage unit 113 (in S8). The information of the image processing to be executed on the layer data items is associated with the region information and set in the setting storage unit 116 in advance. Information that indicates positions to which the image processing is applied is also set in the setting storage unit 116. The positions to which the image processing is applied are coordinates fixed in the overall image data, coordinates fixed in the layer data items, coordinates from which the facial parts are detected in S4, or the like.

As an example of the image processing according to the embodiment, processing such as makeup may be subjected to a layer data item of eyes, a layer data item of a face, and the like. For the processing, information of settings for associating eyebrows and eyelashes with the positions of eyes and drawing the eyebrows and the eyelashes, information of settings for superimposing a predetermined color on a region located within the contour of the face, and information of settings for relatively changing colors, color saturation and brightness of the region located within the contour of the face, are held by the setting storage unit 116.

Images of an accessory and clothes may be superimposed on an arbitrary layer data item. Graphics such as a star shape and scribble drawn by a user may be superimposed on an arbitrary layer data item. In order to superimpose image data, the image data is associated with coordinates of a standard point, coordinates of the overall image data, or coordinates of a point within a layer data item, and held by the setting storage unit 116. A layer data item for drawing may be used as well as the layer data items selected in S7.

In addition, the eyes may be highlighted by enlarging the layer data item of the eyes, and an effect of a light source may be given to an arbitrary layer data item so as to brighten the layer data item. In order to highlight the eyes, the overall layer data item of the eyes or the rate of enlarging the region depicting the eyes and included in the layer data item of the eyes is held by the setting storage unit 116. In order to provide a predetermined effect such as the effect of the light source to an image or execute a filtering process on the image, a position at which the predetermined effect is provided, an algorithm for adding the predetermined effect, and the like are held by the setting storage unit 116. Instead of causing the setting storage unit 116 to hold the algorithm for adding the predetermined effect, the setting storage unit 116 may hold a command to activate a process of adding the predetermined effect, a subscript for activating the process of adding the predetermined effect, or the like.

In addition, the shape of an arbitrary layer data item may be changed. For example, information of settings for changing a hair style or the like may be held by the setting storage unit 116. The process of changing the shape, color or position of image data, the process of drawing an image, a process of highlighting an edge, smoothing, a filtering process such as a process of removing noise may be executed using existing techniques.

Figure 11:
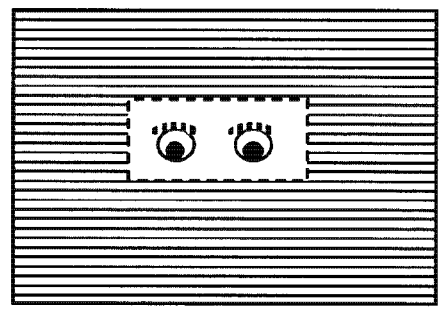
FIG. 11 is a diagram describing an example of image processing.

FIG. 11 illustrates an example in which a layer data item of eyes is highlighted and an image of eyelashes is superimposed. It is assumed that the rate of enlarging the layer data item of the eyes, and information of settings for associating the image of the eyelashes with an image of an upper part (or an upper part located on the upper side of coordinates of the eyes in a vertical direction) located on the upper side of the eyes and drawing the image of the eyelashes, are stored in the setting storage unit 116. The image processing unit 115 enlarges the overall layer data item of the eyes at a predetermined rate, for example. The image processing unit 115 may extract the region depicting the eyes from the layer data item and enlarge the extracted region. In addition, the image processing unit 115 draws the eyelashes at the upper part located on the upper side of the coordinates of the eyes.

Figure 12:
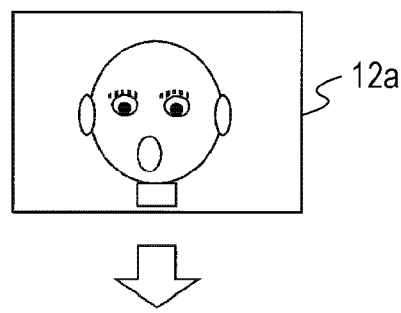
FIG. 12 is a diagram describing an example of the image processing.
Figure 12:
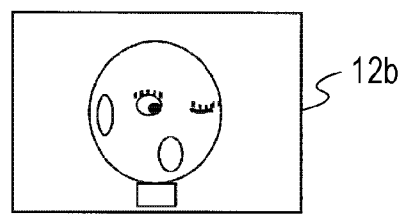
Figure 12:
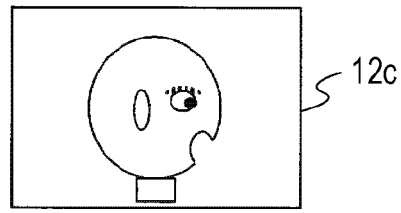

If a direction in which the person who is the object faces changes, set positions that are associated with the coordinates (for example, the standard points) at which the facial parts are detected and to which the image processing is applied may follow the standard points or the like and be changed. For example, the image processing unit 115 may determine a direction in which the person faces on the basis of positional relationships among the facial parts detected by template matching, follow the facial parts, and change a position at which the image processing is applied, as illustrated in FIG. 12. Specifically, the image processing unit 115 may change a position at which eyelashes are drawn on the basis of the standard points detected from the image data, as indicated by 12a to 12c. If a standard point that corresponds to the left eye is not detected from the image data as indicated by 12c, the image processing unit 115 may not draw eyelashes associated with the left eye. In addition, the image processing unit 115 may calculate a vector on the basis of a change of facial expression and change image data to be drawn, as indicated by 12b.

After that, the difference determining unit 117 reads, from the data storage unit 113, the layer data items newly stored after the image processing in S8 and layer data items stored before S8 and after the image processing. Then, the difference determining unit 117 compares layer data items having the same region information and determines whether or not there is a difference between the layer data items for each of groups of layer data items having the same region information (in S9). For example, the difference determining unit 117 compares a layer data item having the newest chronological information among layer data items having the same region information in identification codes with a layer data item having the second newest chronological information among the layer data items having the same region information in the identification codes. Specifically, the difference determining unit 117 compares the newest image data with image data preceding the newest image data in a video image for each of the facial parts.

For the comparison, information of colors of pixels or the like is used, and an XOR operation is executed. If the number of pixels of which values of results of the XOR operation are true values is equal to or larger than a predetermined threshold, the difference determining unit 117 determines that there is a change between the newest image data and the preceding image data. In addition, the difference determining unit 117 may treat groups of multiple pixels as blocks and determine whether or not there is a change between the newest image data and the preceding image data for each of the blocks. For example, a fine block may be used for each of layer data items of eyes and a mouth, and a coarse block may be used for a layer data item of a background. In this case, a small change may be detected from facial expression, compared with the background.

If the difference determining unit 117 determines that a changed layer data item does not exist (No in S9), the transmitter 118 reads audio data from the data storage unit 113 and transmits the read audio data to the other communication device 1 that is the destination communication device (in S10). Then, the process of transmitting the image data is terminated, and the process of transmitting newly acquired image data is repeated from 51. In other words, the same process is executed on the next frame included in the video data. The process of transmitting the audio data may not be executed if a sound of a predetermined level or higher is not input.

If the difference determining unit 117 determines that the changed layer data item exists (Yes in S9), the transmitter 118 reads the layer data item determined to have changed (or the changed layer data item) and audio data from the data storage unit 113 and transmits the read layer data item and the read audio data to the other communication device 1 that is the destination communication device (in S11).

It is assumed that the layer data items 10m to 10r illustrated in FIGS. 10A to 10F are stored in the data storage unit 113 as image data preceding the interested image data. In addition, it is assumed that the processes of operations 51 to S8 are executed on image data illustrated in FIG. 13.

Figure 13:
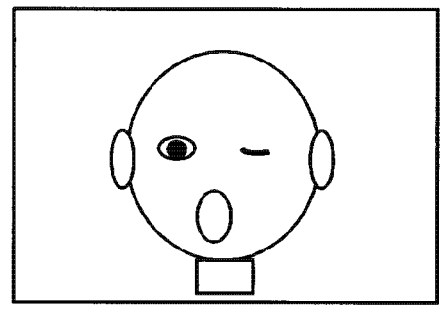
FIG. 13 is a diagram illustrating an example of image data.
Figure 14A:
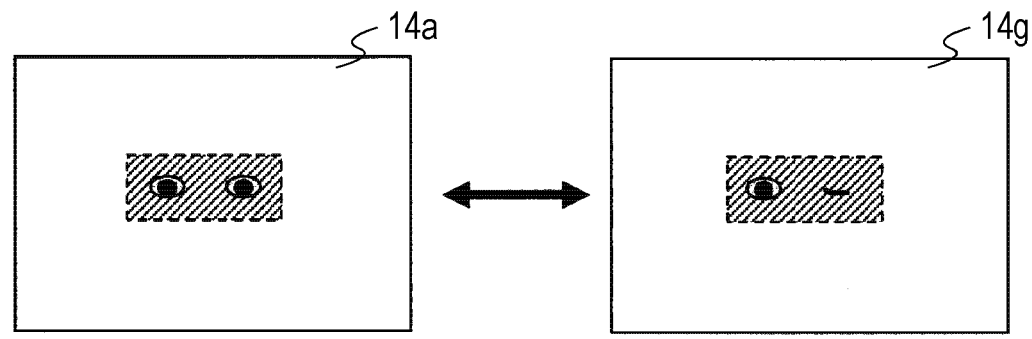
FIG. 14A is a diagram describing comparison of layer data items.
Figure 14B:
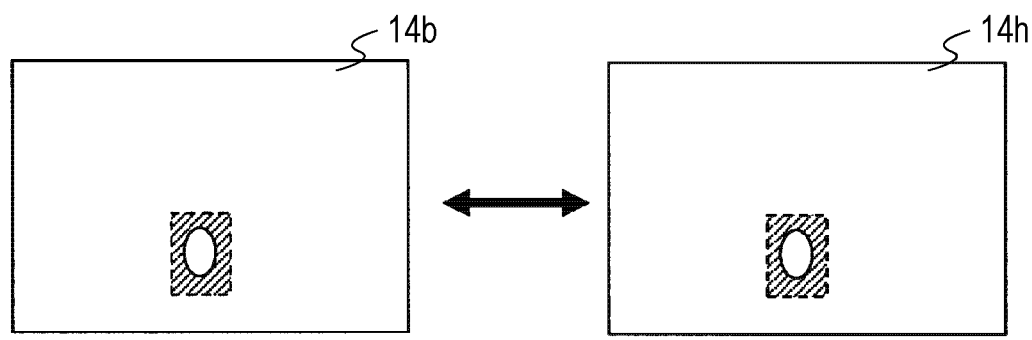
FIG. 14B is a diagram describing comparison of layer data items.
Figure 14C:
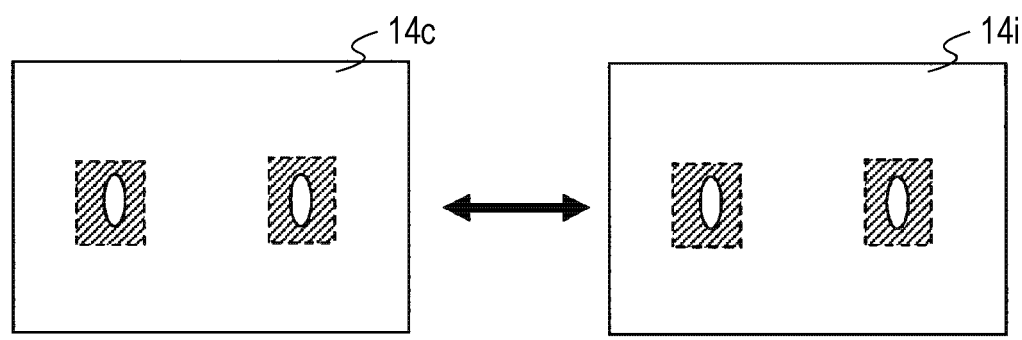
FIG. 14C is a diagram describing comparison of layer data items.
Figure 14D:
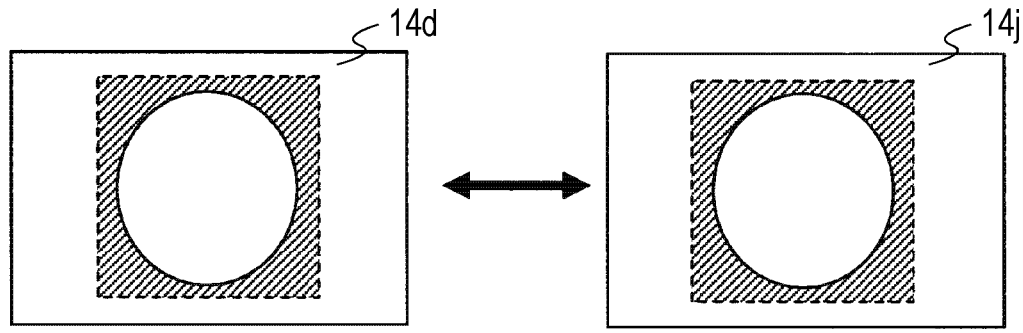
FIG. 14D is a diagram describing comparison of layer data items.
Figure 14E:
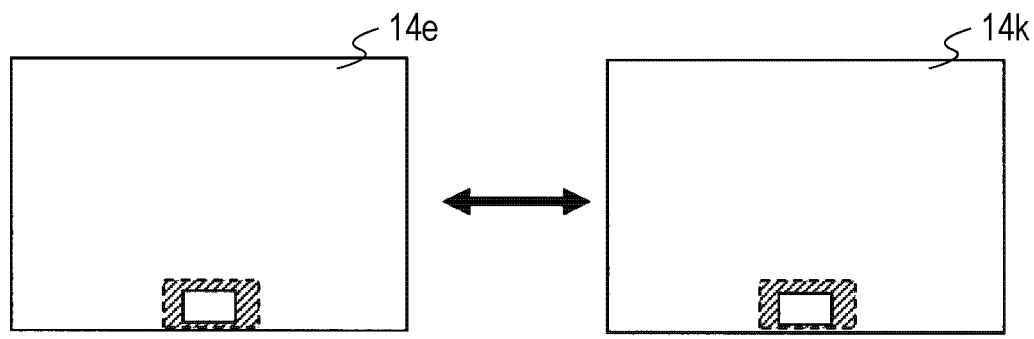
FIG. 14E is a diagram describing comparison of layer data items.
Figure 14F:
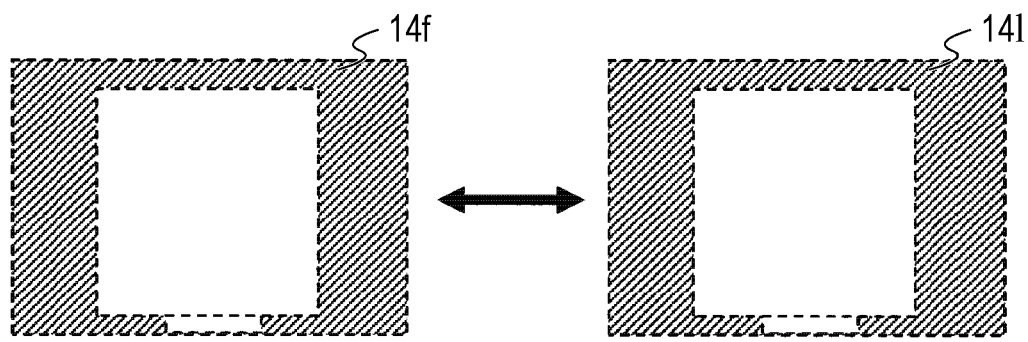
FIG. 14F is a diagram describing comparison of layer data items.

FIG. 13 illustrates an example of the image data. It is assumed that the image data illustrated in FIG. 13 is data acquired from a frame succeeding the image data illustrated in FIG. 7. The person is depicted in the image data illustrated in FIG. 13. A part in which the left eye is closed (or the person winks) is different from the image data illustrated in FIG. 7. Layer data items illustrated in FIGS. 14A to 14F are generated from the image data illustrated in FIG. 13 by the processes up to S8.

FIGS. 14A to 14F are diagrams describing the process of comparing layer data items having consecutive chronological information and the same region information. In S9, the layer data items 14a to 14f that are generated from the preceding image data and have the same region information are compared with newly generated layer data items 14g to 14l having the same region information. In an example illustrated in FIGS. 14A to 14F, the difference determining unit 117 determines that there is a difference between the layer data items 14a and 14g illustrated in FIG. 14A. In this case, the transmitter 118 transmits the layer data item 14g and audio data.

A pixel that represents a transparent region included in a layer data item may be represented by a predetermined value (of, for example, 0 or 1) indicating the transparent region using an algorithm such as the run-length method. In this case, the size of a file to be transmitted may be reduced, compared with the case where the overall image data is transmitted. When the layer data item and the audio data are transmitted, the process of transmitting the image data is terminated and the process of transmitting newly acquired image data is repeated from S1.

Figure 15:
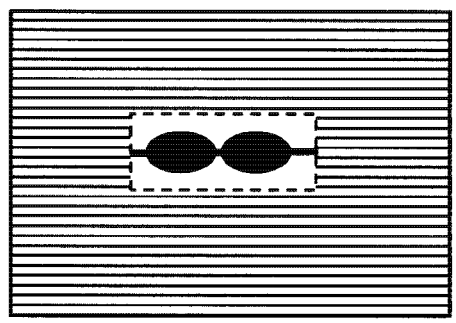
FIG. 15 is a diagram describing an example of the image processing.

As described above, in the transmission process according to the embodiment, image data is divided into a plurality of layers on the basis of an object, the image processing of the various types is executed for each of the layers, and data of a layer from which a change is detected is transmitted. A change between layer data items is detected after the image processing. Thus, even if a change exists in captured image data and the image processing is executed on layer data items, there may be no change between the layer data items before the image processing and the layer data items after the image processing. As illustrated in FIG. 15, if an image of sunglasses is superimposed on a layer data item of eyes, and the person illustrated in FIG. 7 winks as illustrated in FIG. 12, each of the layer data item of the eyes before the image processing and the layer data item of the eyes after the image processing is a layer data item illustrated in FIG. 15 and a change does not exist. In this case, the layer data of the eyes is not transmitted. Thus, the amount of data traffic is reduced, compared with the case where the difference determining unit 117 determines whether or not there is a difference without the image processing (or the case where the layer data item of the eyes of the person who winks is transmitted).

In the embodiment, the image processing is executed on layer data items. Thus, an image to be displayed by a destination communication device may be changed by executing processing such as makeup or processing an image of clothes. For example, even if a user is not dressed properly, psychological resistance of the user to use of a videophone or the like may be reduced. If a layer that is used to execute the image processing and different from layers including facial parts is provided, it is easy to execute the image processing on layer data and process the layer data so as to obtain the layer data before the image processing. Thus, a range of use of the layer data increases. The layer data after the image processing may be used as an avatar to be displayed as a virtual image of a user on a computer network.

Reception Process

Next, a process of receiving video data is described. The reception process is executed by the receiving device 12 of the communication device 1.

Figure 16:
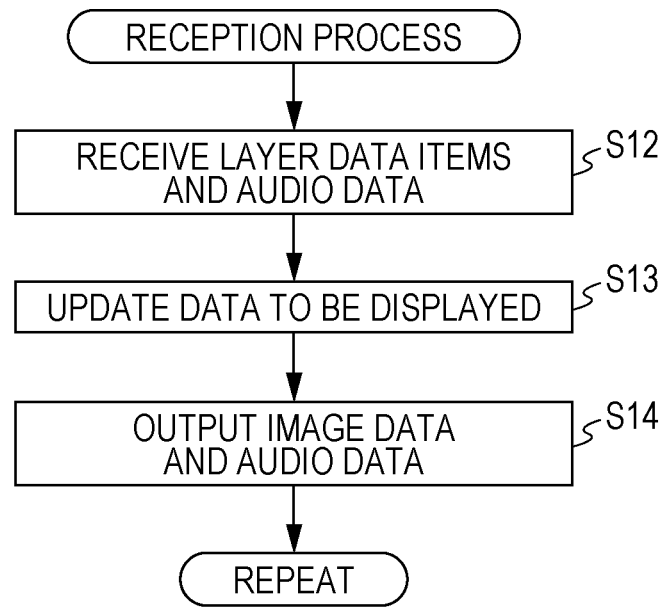
FIG. 16 is a flowchart of an example of a reception process.

FIG. 16 is a flowchart of an example of the reception process. The receiver 121 of the receiving device 12 receives layer data items and audio data from the other communication device 1 and causes the layer data items and the audio data to be stored in the data storage unit 122 (in S12 illustrated in FIG. 16), while the other communication device 1 is the destination communication device. In the embodiment, the receiver 121 receives the plurality of layer data items generated on the basis of image data. For example, the receiver 121 receives all the layer data items generated on the basis of the image data immediately after the start of the process. The receiver 121 receives changed layer data items for image data after the reception of all the layer data items. The audio data is held by the data storage unit 122.

Then, the display updating unit 123 reads the layer data items received in S12 from the data storage unit 122, updates layer data items to be displayed, and causes the layer data items to be stored in the data storage unit 122 (in S13). The layer data items to be displayed are layer data items that have the newest chronological information among the received layer data items for each of regions indicated by the region information of the received layer data items. The layer data items to be displayed are held by the data storage unit 122.

If all the divided layer data items are received after the start of the process, the display updating unit 123 causes all the layer data items to be held by the data storage unit 122. If a layer data item corresponding to a part of facial parts is received, the display updating unit 123 replaces a layer data item having the same region information and held as a layer data item to be displayed with the received layer data item. Specifically, the display updating unit 123 replaces a layer data item having old chronological information with a layer data item having new chronological information for each of groups of layer data items having the same region information and causes the layer data items that are to be displayed to be stored in the data storage unit 122.

After that, the image output unit 124 reads the layer data items to be displayed from the data storage unit 122 and causes the layer data items to be displayed on the display device such as the display, and the audio output unit 125 reads audio data from the data storage unit 122 and causes the audio data to be output from the audio output display such as the speaker (in S14). The image output unit 124 overlaps the layer data items to be displayed in a predetermined order on the basis of the region information and outputs the layer data items as a single image data item. For example, the image output unit 124 overlaps all the layer data items in the virtual depth direction in the order of a layer data item of a background, a layer data item of a neck, a layer data item of a face, a layer data item of ears, a layer data item of a mouth, and a layer data item of eyes from the back side to the front side and outputs the single image data item. The process of receiving the layer data items is terminated. Then, the process of newly receiving layer data items is repeated from S12.

In the embodiment, the image output and the audio output may be synchronized with each other using a buffer. The throughput of real-time communication largely depends on the calculation performance of a transmitting communication device, a data transfer rate, and the calculation performance of a receiving communication device. Even if a single packet of audio data or data with a similar amount to the single packet is delayed, the output timing may be synchronized using the buffer. Specifically, the timing of a motion of a lip and the timing of voice production may be synchronized.

In the reception process according to the embodiment, layer data items are received for each of layers. Thus, the amount of data traffic may be reduced, compared with the case where the overall image data is received. The layer data items after the image processing are transmitted. Thus, even if the captured image data has a change that does not appear in the layer data items after the image processing, the communication device 1 has an effect of further reducing the amount of the data traffic. If layer data items are replaced with each other for each of layers, loads to be applied to the processes are reduced, compared with the case where regions that have a difference between them are extracted for each image data and transmitted and received. Specifically, a plurality of layers may overlap each other in a simple manner using predetermined coordinates as a standard point, for example, using the coordinates of an upper left point as the origin without execution of a process of shifting the positions of data items to be displayed. Thus, a delay of the process and the possibility of an omission of a part of the process may be reduced in the embodiment.

Amount of Data Traffic and Process Load

Next, advantages of the embodiment regarding the amount of data traffic and a process load are described. For the case (1) where overall image data is transmitted, the case (2) where a changed region is extracted from image data and transmitted, and the case (3) where the transmission process according to the embodiment is executed, the following advantages and disadvantages are described below: advantages and disadvantages obtained when the processes are executed by a device that is, for example, a mobile phone and has relatively low throughput, advantages and disadvantages obtained when communication is executed through a network with a low data transfer rate.

First, an ideal frame rate (or intervals at which video data is updated) is described. According to Experimental Studies on the Seeing of Motion by Max Wertheimer, when two light spots alternately blink at intervals of 60 milliseconds to 100 milliseconds, a human feels that a light spot smoothly moves. Thus, it is preferable that a displayed image be updated at an interval of approximately 60 milliseconds to 100 milliseconds.

Figure 17:
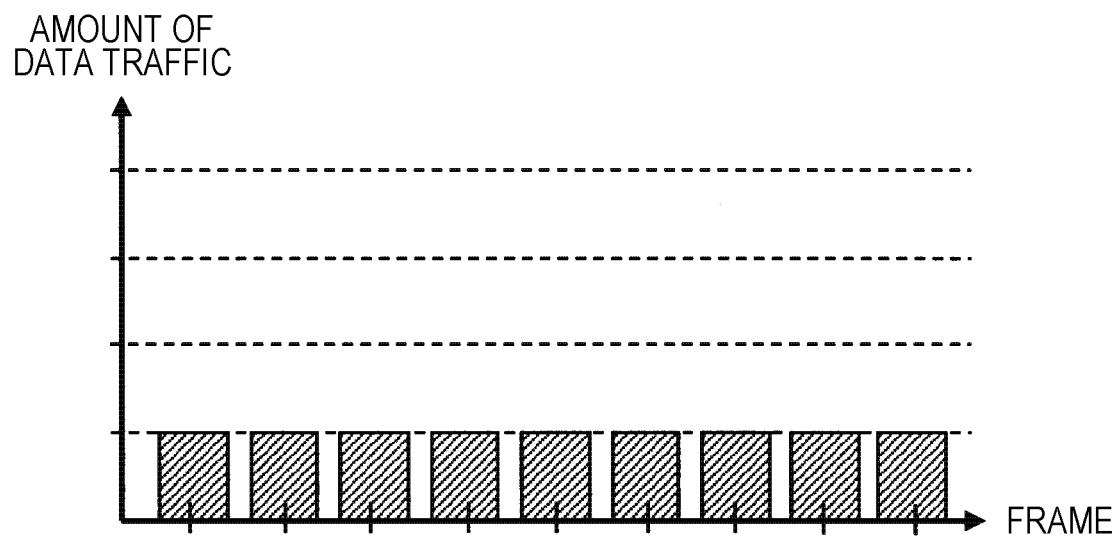
FIG. 17 is a graph schematically illustrating ideal changes in the amount of data traffic with respect to transition of frames.

FIG. 17 is a graph illustrating ideal changes in the amount of data traffic with respect to transition (time passage) of frames. In the graph of FIG. 17, the ordinate indicates the amount of the data traffic, and the abscissa indicates the transition (time passage) of the frames. A frame rate is 30 frames per second, for example. In the case illustrated in FIG. 17, data is transmitted for each of the frames. When displaying of a video image is updated by a receiving communication device at the same intervals as the transmission, the user's eyes may see a sufficiently smooth motion in the video image. In addition, it is preferable that the amount of data traffic be suppressed so that data is transmitted through a network with a relatively low data transfer rate without a delay.

(1) Case where Overall Image Data is Transmitted

The following describes the case where overall image data acquired by a transmitting communication device is transmitted and a receiving communication device replaces overall image data with the received image data in the order in which the image data is received.

Figure 18:
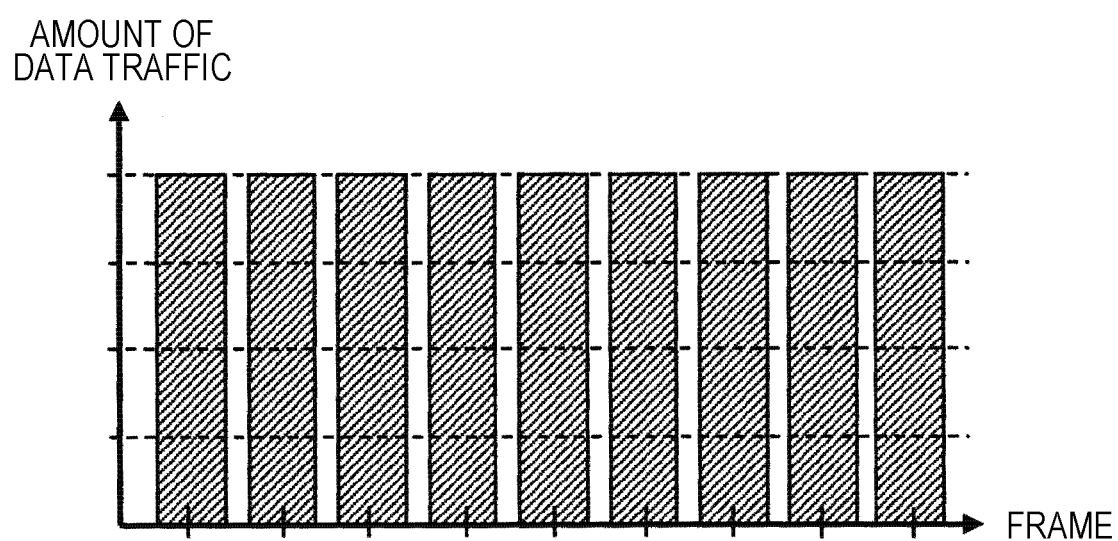
FIG. 18 is a graph schematically illustrating changes in the amount of data traffic with respect to transition of frames when overall image data is transmitted.

FIG. 18 is a graph schematically illustrating changes in the amount of data traffic with respect to transition of frames when the overall image data is transmitted. In the example illustrated in FIG. 18, a process load of the transmitting communication device is reduced since a process of specifying a changed region is not executed. Thus, image data may be transmitted for each of the frames. Advantages are that a video image is smooth and process loads of the transmitting and receiving communication devices are low. Since the overall image data is transmitted, the amounts of data traffic for the frames are nearly equal to each other. The amount of data traffic is larger, compared with the case where a part of the image data is transmitted. Thus, a disadvantage is that the amount of data traffic is large.

(2) Case where Changed Region is Extracted and Transmitted

Figure 19:
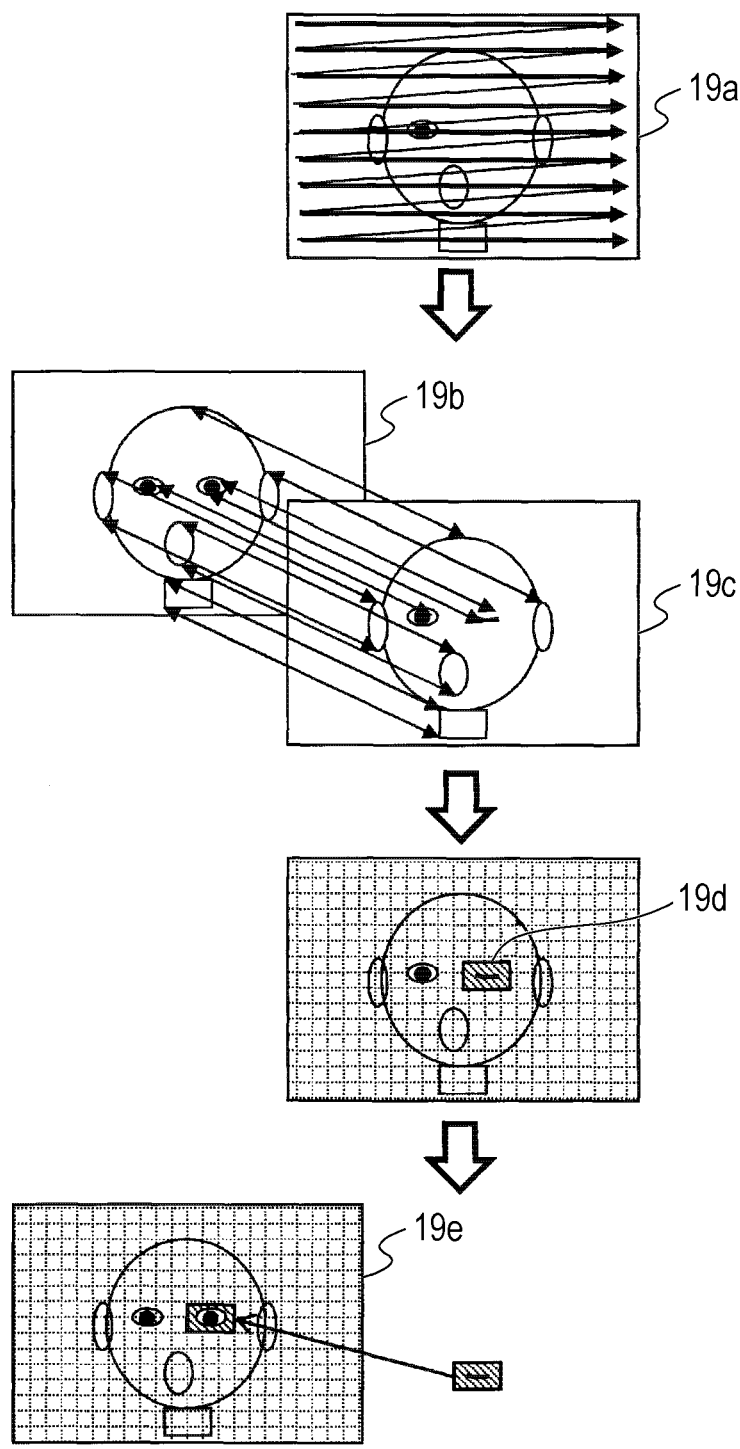
FIG. 19 is a diagram describing a process of extracting and transmitting a changed region.

The following describes the case where a transmitting communication device compares newly acquired image data with a frame (or image data) preceding the newly acquired image data, extracts a changed region, and transmits image data of the changed region and the coordinates of the changed region. A process of extracting and transmitting the changed region is executed by procedures illustrated in FIG. 19, for example. First, the transmitting communication device scans the captured image data (19*a*), and compares the newly acquired image data with the preceding frame so as to determine whether or not there is a difference between the newly acquired image data and the preceding frame (19*b*). If the difference is detected, the transmitting communication device extracts a changed region and transmits the changed region and the coordinates of the changed region (19*c*). The receiving communication device uses the received region and the coordinates of the received region to remove a region corresponding to the received region from the preceding frame and insert the received region in the preceding frame (19*d*) and generates new image data (19*e*).

Figure 20:
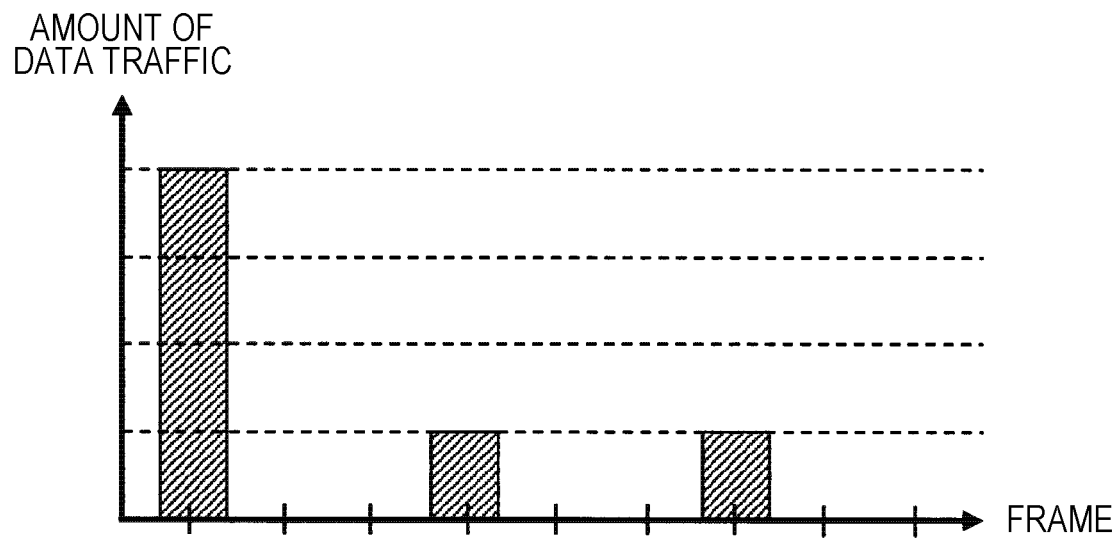
FIG. 20 is a graph schematically illustrating changes in the amount of data traffic with respect to transition of frames when changed regions are extracted and transmitted.

FIG. 20 is a graph schematically illustrating changes in the amount of data traffic with respect to transition of frames when changed regions are extracted and transmitted. In an example illustrated in FIG. 20, a preceding frame does not exist upon the start of the process, and overall image data is transmitted instead of the region of a difference. Thus, the amount of data traffic for the first frame is larger than the amount of data traffic for each of subsequent frames. On the other hand, a region of a difference is extracted and transmitted for each of the subsequent frames. Thus, if the video data represents that the person who is the object talks, the amount of data traffic (or a changed image region) is smaller, compared with the case where the overall image data is transmitted. Thus, an advantage obtained when changed regions are extracted and transmitted is that the amount of data traffic is suppressed.

In addition, the transmitting communication device executes the process of extracting a difference from image data, and the receiving communication device executes the process of updating the image data using the difference. Since the transmitting communication device detects the difference, accurately compares regions and calculates a region to be updated, a process load to be applied to the transmitting communication device is larger, compared with the case where the overall image data is transmitted. Thus, a device that is, for example, a mobile phone and has relatively low throughput may transmit data once or the like for only several frames (or a frame rate may be reduced). Thus, a disadvantage is that the process load may be larger and the frame rate may be lower, compared with the case where the overall image data is transmitted.

(3) Case where Transmission Process According to Embodiment is Executed

Figure 21:
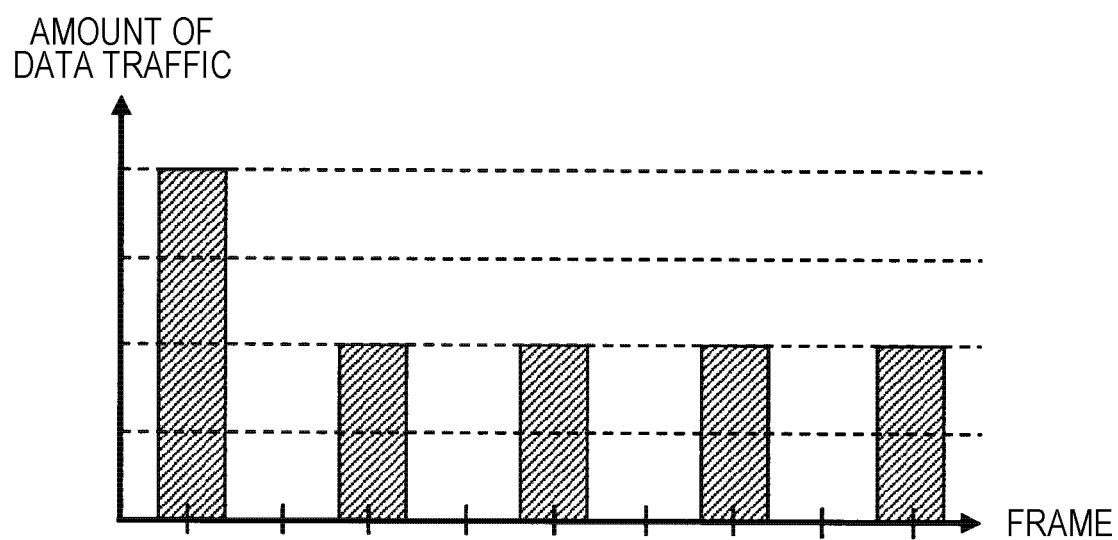
FIG. 21 is a graph schematically illustrating changes in the amount of data traffic with respect to transition of frames in the embodiment.

FIG. 21 is a graph schematically illustrating changes in the amount of data traffic with respect to transition of frames when the transmission process according to the embodiment is executed. In an example illustrated in FIG. 21, upon the start of the process, a preceding frame does not exist and all layer data items are transmitted. Thus, the amount of data traffic for the first frame is larger than the amount of data traffic for each of subsequent frames. A layer data item from which a difference is detected is transmitted for each of the subsequent frames. Thus, if the video data represents that the person who is the object talks, the amount of data traffic (or changed image regions) is smaller, compared with the case where the overall image data is transmitted. Since the frames are transmitted on a predetermined frame basis as well as the changed regions, the amount of data traffic is larger, compared with the case where the changed regions are extracted.

Since the process of generating layer data items is executed, a process load is larger, compared with the case where the overall image data is transmitted without a change. The image data is expanded into layer data items and it is determined whether or not a change exists for each of layers. A changed region, however, is not identified. Thus, a process load is lower, compared with the case where a changed region is extracted from the image data. Specifically, a frame rate is lower, compared with the case where the overall image data is transmitted. In addition, the frame rate is higher, compared with the case where a changed region is extracted and transmitted.

Although the amount of data traffic actually varies depending on the amount of a change in an image, the amounts of data traffic are basically the same as described above. The amount of data traffic and a process load may be well balanced in the embodiment, compared with the case where overall image data is transmitted and the case where a changed region is extracted and transmitted. Thus, the method according to the embodiment is suitable especially for the case where the data transfer rate of the network is low and the throughput of the communication devices is low. In addition, if input of a sound with a predetermined level or higher is detected and audio data of the sound is transmitted, the amount of data to be transferred may be suppressed.

MODIFIED EXAMPLE

The following describes another embodiment in which layer data generated by the layer generator 114 and layer data received by the receiver 121 are combined and image data after the combination is output by the image output unit 124. In the present embodiment, a communication device 3 illustrated in FIG. 22 is used.

Figure 22:
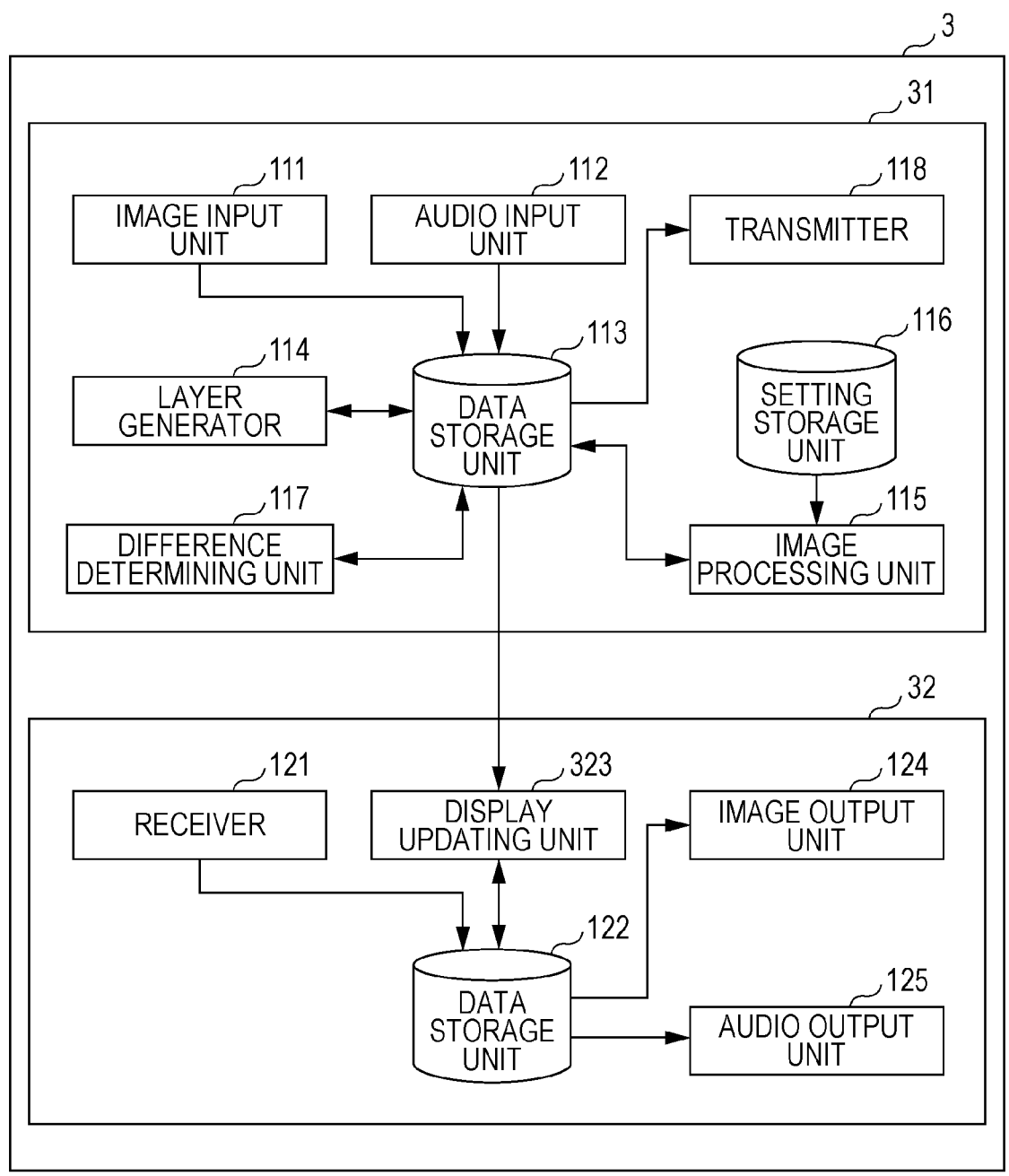
FIG. 22 illustrates an example of a functional block diagram of a communication device according to another embodiment.

FIG. 22 illustrates an example of a functional block diagram of the communication device 3 according to the present embodiment. Functional blocks that are included in the communication device 3 and serve as the same functions as those included in the communication device 1 are indicated by the same reference numerals as the functional blocks included in the communication device 1.

The communication device 3 has a transmitting device 31 and a receiving device 32. The transmitter 31 has the image input unit 111, the audio input unit 112, the data storage unit 113, the layer generator 114, the image processing unit 115, the setting storage unit 116, the difference determining unit 117 and the transmitter 118. The functions 111 to 118 are the same as the transmitting device 11 of the communication 1. The data storage unit 113 is connected to a display updating unit 323 included in the receiving device 32.

The receiving device 32 has the receiver 121, the data storage unit 122, the display updating unit 323, the image output unit 124, and the audio output unit 125. The display updating unit 323 reads a layer data item generated by the layer generator 114 of the transmitting device 31 from the data storage unit 113, reads a layer data item received by the receiver 121 of the receiving device 32 from the data storage unit 122, combines the read layer data items, and generates image data to be displayed. Other functions of the communication device 3 are the same as the communication device 1.

Specifically, the communication device 3 according to the present embodiment combines the layer data item to be transmitted to a destination communication device 3 with the layer data item received from the destination communication device 3 and displays a single video image. The combination of the layer data items is described with reference to FIG. 23.

Figure 23:
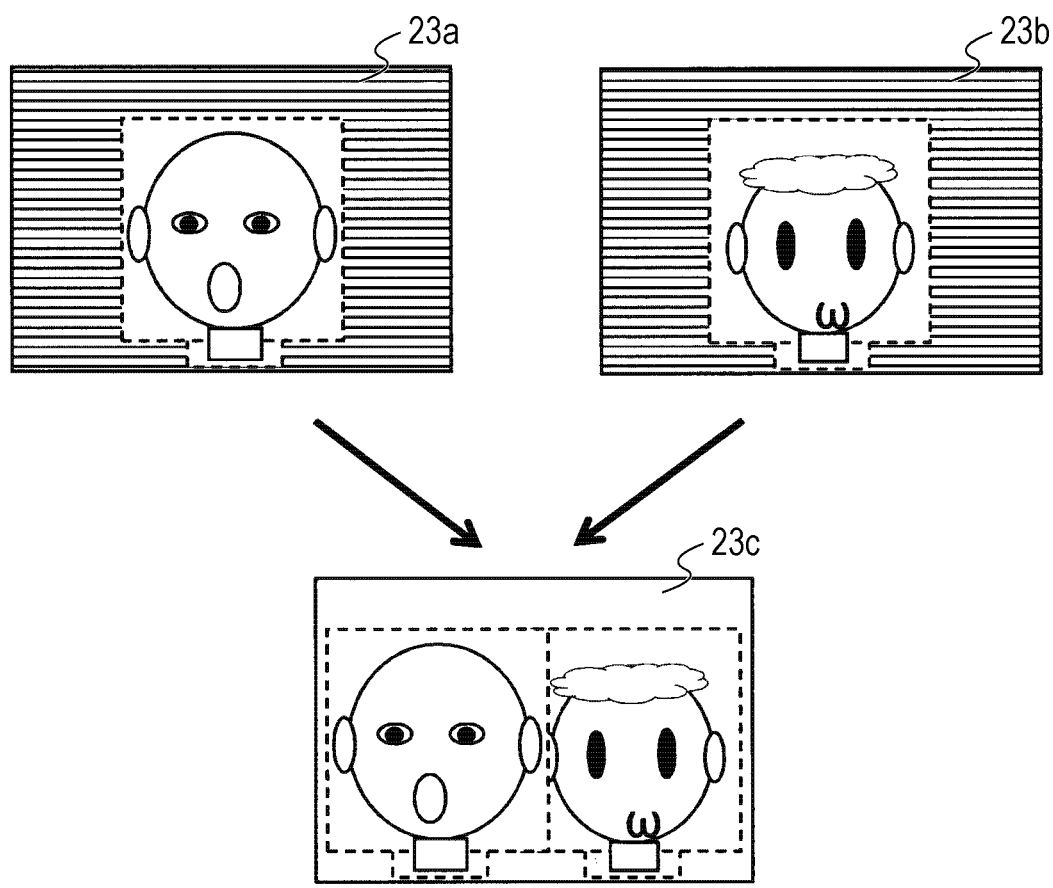
FIG. 23 is a diagram describing a combination of a layer data item to be transmitted and a received layer data item.

FIG. 23 is a diagram describing the combination of the layer data item to be transmitted with the received layer data item. For example, a layer data item 23a is generated by a certain communication device 3 and transmitted to a destination communication device 3, and a layer data item 23b is received by the certain communication device 3 from the destination communication device 3. The layer data items 23a and 23b illustrated in FIG. 23 overlap each other, while a layer data item of a background does not overlap the layer data items 23a and 23b in FIG. 23 for convenience of the illustration. In the present embodiment, the layer data items 23a and 23b are superimposed in a predetermined order, and an image data item 23c obtained by combining the layer data item 23a with the layer data item 23b is output. The order of superimposing the layer data items 23a and 23b may be determined in advance or changed so that a person whose face is largely depicted is displayed on the front side on the basis of the contour of the face identified on the basis of the layer data item of the face. The layer data item of the background may be generated by any of the communication devices 3. Another prepared image may be used as the layer data item of the background.

Transmission and Reception Process

Next, a process of transmitting and receiving video data is described. The transmission and reception process is executed by the transmitting device 31 and receiving device 32 of the communication device 3.

Figure 24:
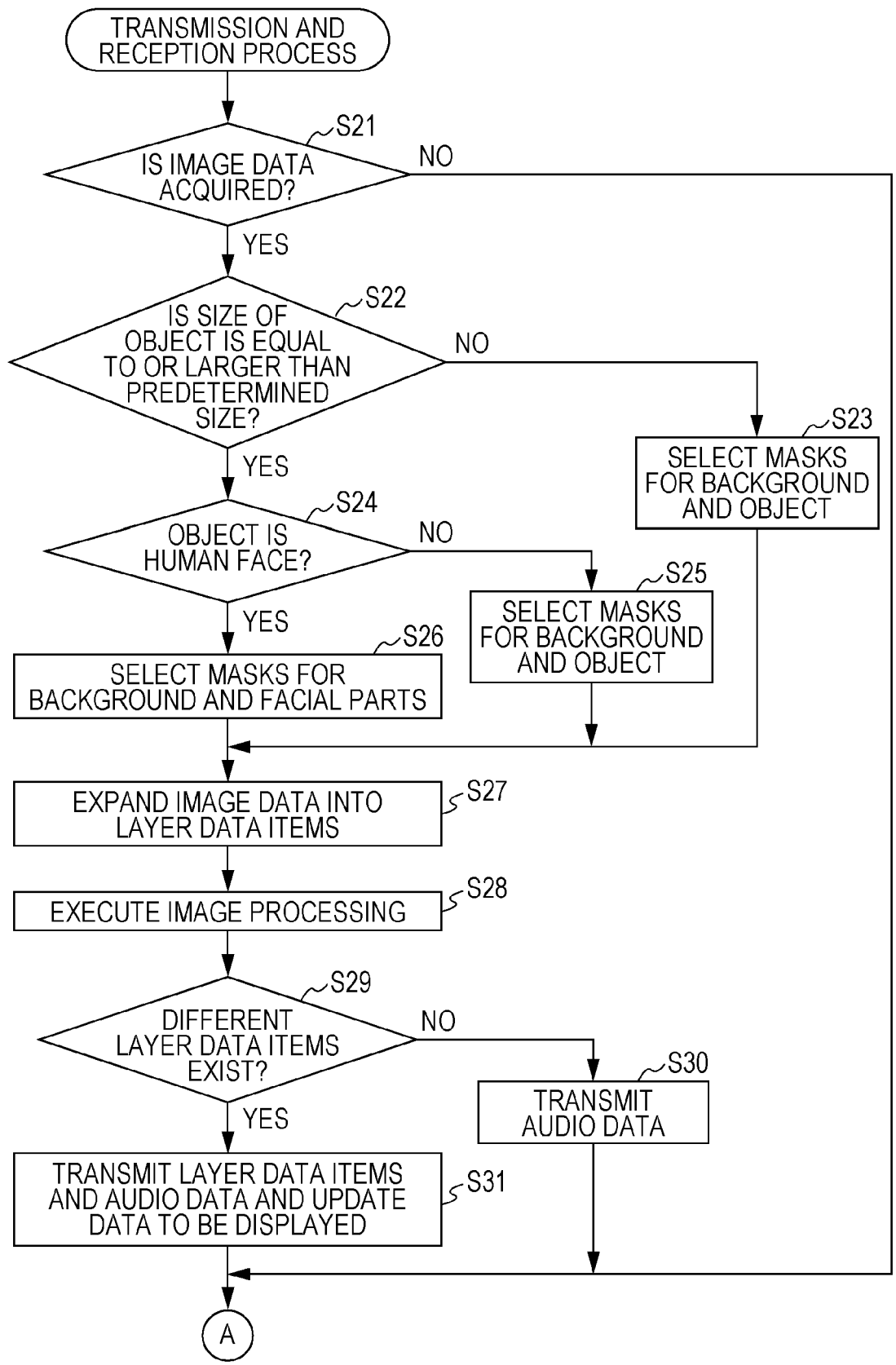
FIG. 24 is a flowchart of an example of a transmission and reception process according to the other embodiment.
Figure 25:
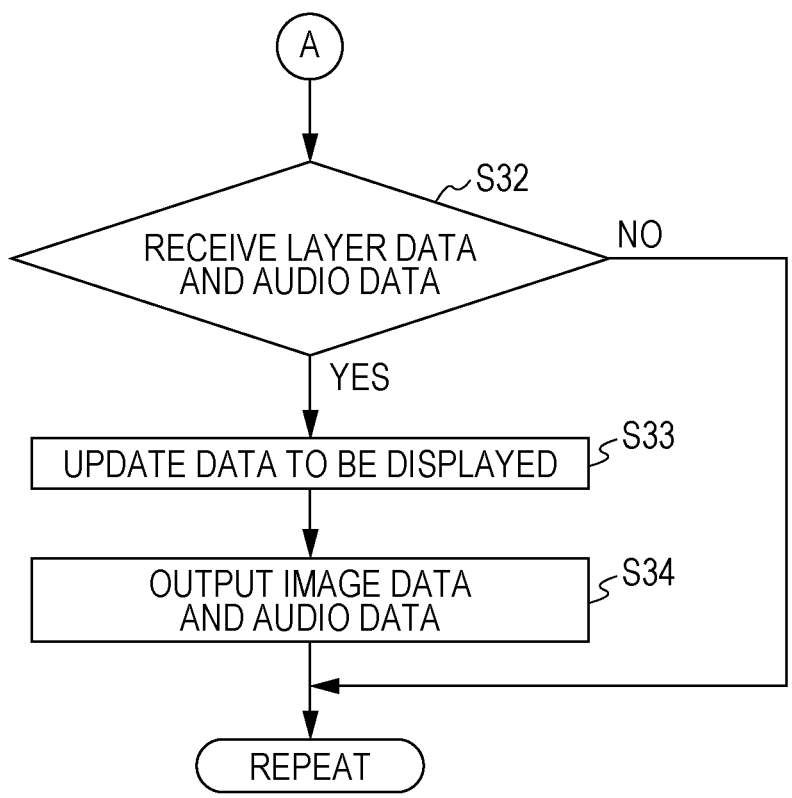
FIG. 25 is a flowchart of the example of the transmission and reception process according to the other embodiment.

FIGS. 24 and 25 are a flowchart of an example of the transmission and reception process according to the embodiment. First, the layer generator 114 of the transmitting device 31 determines whether or not new image data is stored in the data storage unit 113 (in S21 illustrated in FIG. 24). Specifically, the image input unit 111 of the transmitting device 31 acquires the new image data through a camera or the like, and the layer generator 114 of the transmitting device 31 determines whether or not the new image data is stored in the data storage unit 113.

If the layer generator 114 determines that the new image data is not stored (No in S21), the process proceeds to S31 illustrated in FIG. 25 through a connector A. On the other hand, if the layer generator 114 determines that the new image data is stored (Yes in S21), processes of S22 to S31 are executed. The processes of operations S22 to S30 are the same as the processes of S2 to S10 illustrated in FIG. 4, and a description thereof is omitted.

If the difference determining unit 117 determines that there is a difference between layer data items in S29 (Yes in S29), the transmitter 118 of the transmitting device 31 transmits a layer data item (or a changed layer data item) determined to have the difference to a destination communication device 3. In addition, the display updating unit 323 of the receiving device 32 reads the layer data item determined to have the difference from the data storage unit 113 and causes the read layer data item to be stored in the data storage unit 122 (in S31). In this case, the display updating unit 323 updates a layer data item held by the data storage unit 122 and to be displayed.

Specifically, a layer data item that is among layer data items held by the data storage unit 122 as layer data items to be displayed and has the same region information as the layer data item read in S31 is replaced. More specifically, a layer data item with old chronological information is replaced with a layer data item with new chronological information for each of pairs of layer data items that have the same region information. Then, the layer data items after the replacements (or the layer data items to be displayed) are stored in the data storage unit 122. After S31, the process proceeds to S32 illustrated in FIG. 25 through the connector A.

Next, a process illustrated in FIG. 25 is described. If the layer generator 114 determines that the new image data is not stored (No in S21), the display updating unit 323 of the receiving device 32 determines whether or not the new layer data item is stored in the data storage unit 122 (in S32 illustrated in FIG. 25) after S30 and S31. Specifically, the receiver 121 of the receiving device 32 receives the new layer data item from the destination communication device 3 and the display updating unit 323 determines whether or not the new layer data item is stored in the data storage unit 122.

If the display updating unit 323 determines that the new layer data item is not stored (No in S32), the transmission and reception process is terminated. Then, the process of transmitting newly acquired image data and newly receiving layer data items is repeated from S21 (illustrated in FIG. 24).

On the other hand, if the display updating unit 323 determines that the new layer data item is stored (Yes in S32), the display updating unit 323 reads the received layer data item from the data storage unit 122, updates a layer data item to be displayed, and causes the layer data item to be stored in the data storage unit 122 (in S33). In this case, the layer data item that is among the layer data items held by the data storage unit 122 as layer data items to be displayed and has the same region information as the received layer data item is replaced. Specifically, a layer data item with old chronological information is replaced with a layer data item with new chronological information for each of pairs of layer data items that have the same region information. Then, the layer data items to be displayed are stored in the data storage unit 122.

After that, the image output unit 124 reads the layer data items to be displayed from the data storage unit 122 and causes the layer data items to be displayed on the output display such as a display. In this case, the layer data item to be transmitted to the destination communication device 3 and the layer data item received from the destination communication device 3 are read, combined, and displayed. In addition, the audio output unit 125 reads audio data from the data storage unit 122 and causes the audio output device such as the speaker to output the audio data (in S34). Then, the transmission and reception process is terminated. The process of transmitting newly acquired image data and newly receiving a layer data item is repeated from S21 (illustrated in FIG. 24).

According to the modified example, a videophone system that displays an image of users communicating with each other in a single virtual space may be provided as well as the aforementioned effect. Layer data to be transmitted to a destination communication device and layer data received from the destination communication device may be displayed in regions separated from each other without being combined into a single space. Such a system may store a still image depicting a plurality of users as a data file and store a video image depicting a plurality of users as a data file. If the input and output (IF) device of the system according to the embodiment is connected to a printer that is an output device, stored data of the still image may be printed onto a certain paper, a sticker, and the like.

Computer-Readable Recording Medium

A program that causes a computer, other equipment, or another device (hereinafter referred to as computer or the like) to achieve any of the aforementioned functions may be stored in a computer-readable recording medium. The function may be provided by causing the computer or the like to read the program stored in the recording medium and execute the program. The computer-readable recording medium is a recording medium that accumulates data and information of the program and the like using an electric, magnetic, optical, mechanical, or chemical effect and from which the computer or the like may read the data and the information. Examples of the computer-readable recording medium, which are removable from the computer or the like, are a flexible disk, a magneto-optical disc, a CD-ROM, a CD-R/W, a DVD, a Blu-ray disc, a DAT, an 8 mm tape, and a memory card such as a flash memory. Examples of the computer-readable recording medium, which are fixed to the computer or the like, are hard disk and a read only memory (ROM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting device comprising:
a partial image generator that identifies a certain region from image data, generates a certain partial image including the certain region identified from the image data, associates region information indicating the certain region with the certain partial image, and causes the region information and the certain partial image to be stored in a data storage unit;
an image processing unit that executes, on the certain partial image associated with the region information and stored in the data storage unit, predetermined image processing associated with the region information;
a difference determining unit that determines whether or not there is a difference between the certain partial image after the image processing and another partial image generated before a generation of the certain partial image and subjected to the image processing; and
a transmitter that transmits the certain partial image subjected to the image processing by the image processing unit if the difference determining unit determines that there is the difference.

2. The transmitting device according to claim 1,
wherein the certain partial image is represented by a layer in which predetermined coordinates located on a plane including the certain partial image are used as a standard and the certain partial image that overlaps another partial image is displayed.

3. The transmitting device according to claim 1, further comprising
a setting storage unit that stores image processing information associated with the region information and indicating the image processing and positional information indicating a position to which the image processing is applied,
wherein the image processing unit reads, from the setting storage unit, the image processing information and the positional information that are associated with the same region information as the region information added to the certain partial image, and applies the image processing indicated by the image processing information to the position indicated by the positional information.

4. The transmitting device according to claim 1,
wherein the partial image generator scans the image data, detects a pattern indicating a facial part of a person serving as an object, and generates a partial image including the facial part on the basis of the position of the detected facial part of the person.

5. The transmitting device according to claim 1,
wherein the image processing is changing of the shape, color or position of image data included in the partial image, drawing of an image, filtering to be executed on the partial image, or a combination of the changing, the drawing, and the filtering.

6. A receiving device comprising:
a receiver that receives a partial image that includes a certain region identified from image data and has been associated with region information indicating the certain region and subjected to predetermined image processing;
a storage unit that stores a partial image to be displayed; and
a display updating unit that causes the received partial image to be stored in the storage unit as the partial image to be displayed instead of another partial image having added thereto the same region information as the received partial image and chronological information indicating that the other partial image has been generated before generation of the received partial image.

7. A method for transmitting data, the method comprising:
identifying a certain region from image data, generating a certain partial image including the certain region identified from the image data, associating region information indicating the certain region with the certain partial image, and causing the region information and the certain partial image to be stored in a data storage unit;
executing, on the certain partial image associated with the region information and stored in the data storage unit, predetermined image processing associated with the region information;
determining whether or not there is a difference between the certain partial image after the image processing and another partial image generated before the generation of the certain partial image and subjected to the image processing; and
transmitting the certain partial image subjected to the image processing by the image processing unit if it is determined that there is the difference.

* * * * *